(12) United States Patent
Hustyi et al.

(10) Patent No.: US 7,651,148 B2
(45) Date of Patent: Jan. 26, 2010

(54) PASSENGER VEHICLE TRUNK STRUCTURE

(75) Inventors: Dan Hustyi, Waterford, MI (US); Andy Christensen, Livonia, MI (US); Heather S. Konet, Canton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 15 days.

(21) Appl. No.: 12/057,143

(22) Filed: Mar. 27, 2008

(65) Prior Publication Data

US 2009/0243329 A1 Oct. 1, 2009

(51) Int. Cl.
*B62D 25/12* (2006.01)
(52) U.S. Cl. .................. 296/76; 296/26.01; 296/52; 296/53
(58) Field of Classification Search .................. 296/76, 296/193.08, 181.7, 26.01, 53, 52, 59; 16/231, 16/232; 49/394
See application file for complete search history.

(56) References Cited

U.S. PATENT DOCUMENTS

| 5,997,072 | A | * | 12/1999 | Parkinson | 296/146.8 |
|---|---|---|---|---|---|
| 6,641,201 | B1 | * | 11/2003 | Pietryga et al. | 296/100.1 |
| 6,644,707 | B2 | * | 11/2003 | McLaughlin et al. | 296/26.09 |
| 7,017,972 | B2 | * | 3/2006 | Rudolph et al. | 296/107.16 |
| 7,114,769 | B2 | * | 10/2006 | Storc et al. | 296/219 |
| 7,140,657 | B2 | * | 11/2006 | Cuma | 296/26.1 |
| 2007/0096499 | A1 | * | 5/2007 | Zajicek et al. | 296/100.06 |
| 2007/0108792 | A1 | * | 5/2007 | Weldy | 296/100.09 |
| 2007/0257507 | A1 | * | 11/2007 | Hobrecht | 296/100.08 |

* cited by examiner

*Primary Examiner*—Patricia L Engle
*Assistant Examiner*—Sunsurraye Westbrook
(74) *Attorney, Agent, or Firm*—Global IP Counselors, LLP

(57) ABSTRACT

A passenger vehicle trunk structure is provided with a trunk lid, a vehicle body, a hinge arrangement and a tool free hinge release mechanism. The vehicle body defines an interior cargo area with an exterior trunk access opening. The hinge arrangement is pivotally coupling the trunk lid to the vehicle body with the trunk lid being movable between a closed position that covers the exterior trunk access opening and an open position that exposes the exterior trunk access opening to provide access to the interior cargo area through the exterior trunk access opening. The tool free hinge release mechanism is operatively coupled to the hinge arrangement to release the trunk lid from the vehicle body.

16 Claims, 16 Drawing Sheets

PASSENGER VEHICLE TRUNK STRUCTURE

BACKGROUND OF THE INVENTION

1. Field of the Invention

The present invention generally relates to a passenger vehicle with a rear end structure that is changeable to increase cargo capacity. More specifically, the present invention relates to a passenger vehicle trunk structure in which a trunk lid is easily removable to increase cargo capacity.

2. Background Information

Currently cargo capacity of a passenger vehicle's trunk area is limited by trunk cavity size and shape and the trunk opening size and shape. Typically, it is very difficult in most passenger vehicles to carry large bulky items. In order to carry large bulky items, a sport utility vehicle (SUV) or a truck is often needed for the additional storage space and large opening. However, beneficial sport utility vehicles and trucks may be for hauling bulky items, they are not always desirable to many drivers. For instance, sport utility vehicles and trucks tend to be less fuel efficient and less maneuverability as compared to most passenger vehicles. Also driver's personal preferences may for a passenger vehicle such as a coupe or a sedan. Thus, sport utility vehicles and trucks may not be desirable to some driver's, if the cargo capability of a sport utility vehicle or a truck is only used on a limited basis. It would be beneficial to certain drivers to temporarily have the cargo capacity of a sport utility vehicle, while maintaining the fuel efficiency, maneuverability and image/style of a passenger vehicle during the remaining time.

In view of the above, it will be apparent to those skilled in the art from this disclosure that there exists a need for an improved passenger vehicle trunk structure. This invention addresses this need in the art as well as other needs, which will become apparent to those skilled in the art from this disclosure.

SUMMARY OF THE INVENTION

One object of the present invention is to provide a passenger vehicle that ability can to be converted in such a manner as to provide increase cargo capacity and/or utility in the rear end of an otherwise standard the passenger vehicle.

In view of the foregoing object, a passenger vehicle trunk structure is provided that basically comprises a trunk lid, a vehicle body, a hinge arrangement and a tool free hinge release mechanism. The vehicle body defines an interior cargo area with an exterior trunk access opening. The hinge arrangement is pivotally coupling the trunk lid to the vehicle body with the trunk lid being movable between a closed position that covers the exterior trunk access opening and an open position that exposes the exterior trunk access opening to provide access to the interior cargo area through the exterior trunk access opening. The tool free hinge release mechanism is operatively coupled to the hinge arrangement to release the trunk lid from the vehicle body.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
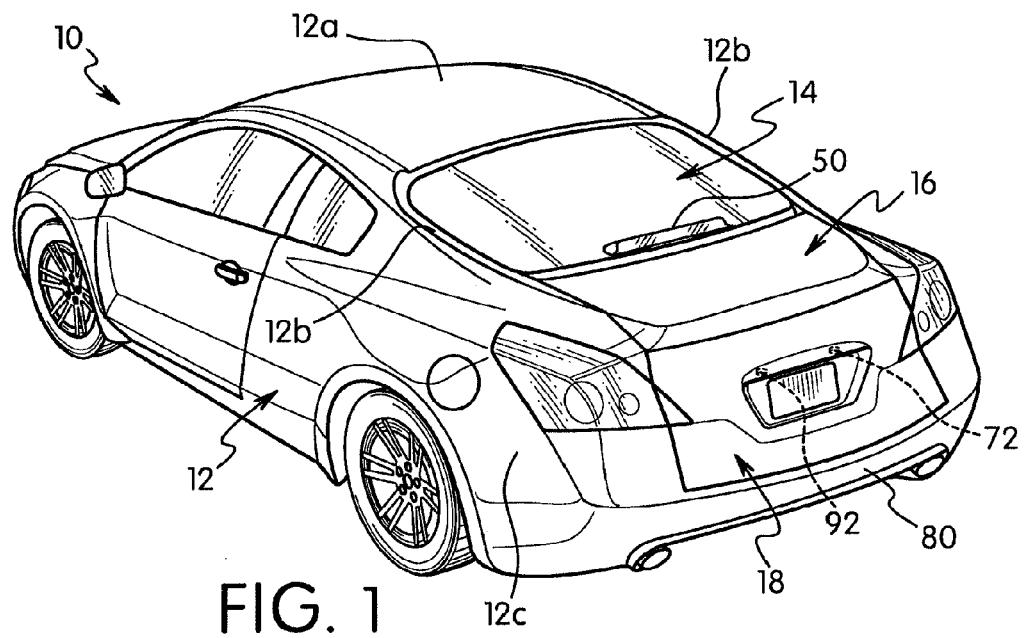
FIG. 1 is a rear end perspective view of a passenger vehicle with a sliding rear window in the down (closed) position, a removable rear trunk lid in the closed position and a pivotal rear panel in the closed position (upright orientation) in accordance with one preferred embodiment.
Figure 2:
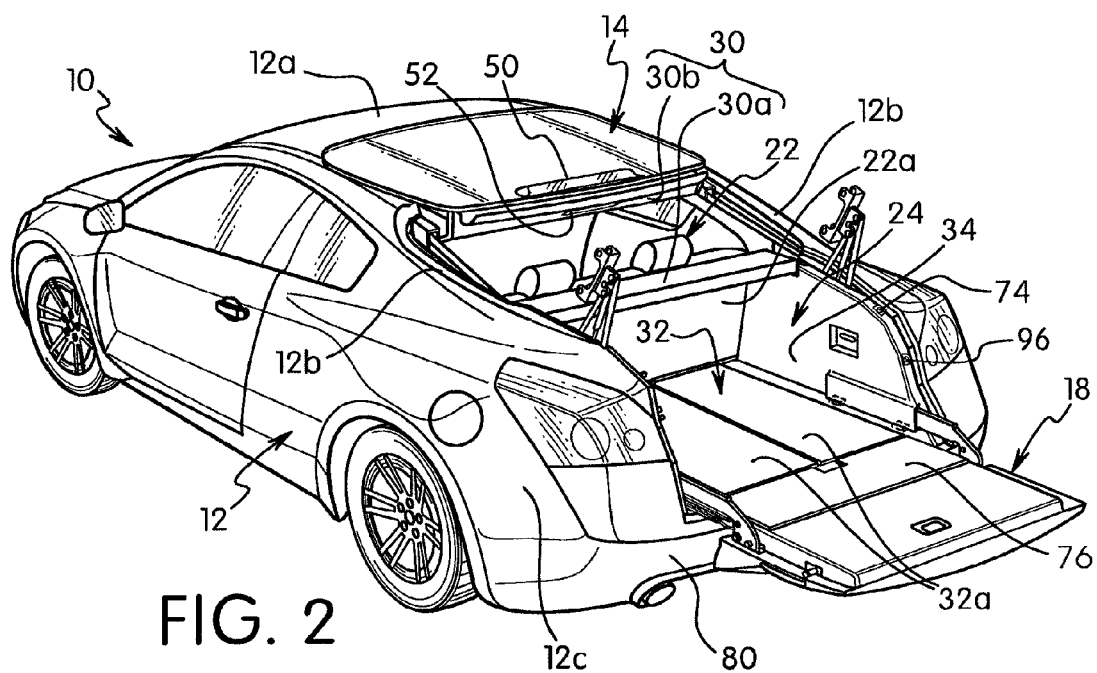
FIG. 2 is a rear end perspective view of the passenger vehicle illustrated in FIG. 1, with the rear window in the up (open) position, the rear trunk lid removed and the rear panel in the open position (horizontal orientation)

Referring initially to FIGS. 1 and 2, a passenger vehicle 10 is illustrated that has a changeable construction to increase cargo capacity and/or utility in accordance with one embodiment. The passenger vehicle 10 has a vehicle body 12 with a sliding rear window 14 that is slidably mounted with respect to the vehicle body 12, a removable rear trunk lid 16 that is removably mounted with respect to the vehicle body 12, and a movable rear body panel 18 slidably and pivotally mounted with respect to the vehicle body 12. Thus, the sliding rear window 14 can be slid to an open position to increase cargo capacity and/or utility. In addition, the rear trunk lid 16 can be easily removed to increase cargo capacity and/or utility. Also the movable rear body panel 18 can be slid rearwardly and pivot from an upright orientation and a horizontal orientation to increase cargo capacity and/or utility. While each of these three cargo capacity expanding features cooperate together, each of the cargo capacity expanding features can be used separately as needed and/or desired.

Figure 3:
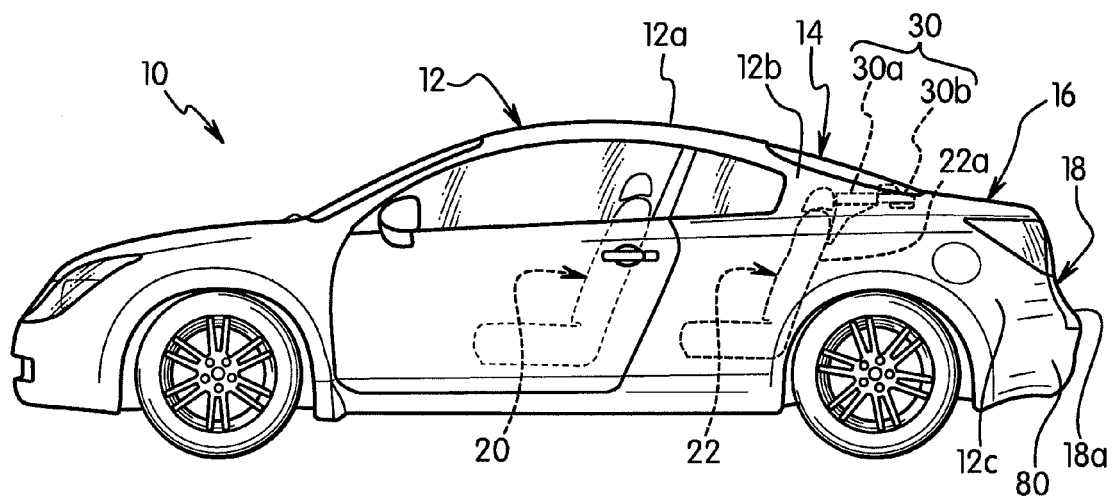
FIG. 3 is a side elevational view of the passenger vehicle illustrated in FIGS. 1 and 2, with the rear window in the down (closed) position, the rear trunk lid in the closed position and the rear panel in the closed position (upright orientation)
Figure 4:
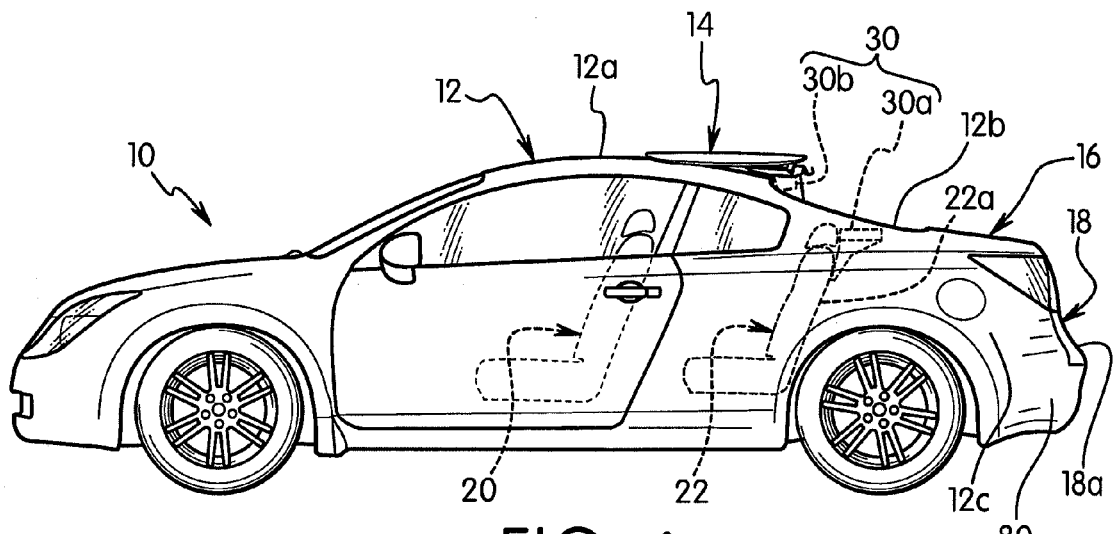
FIG. 4 is a side elevational view of the passenger vehicle illustrated in FIGS. 1 to 3 with the rear window in the up (open) position.

In the illustrated embodiment, as seen in FIGS. 3 and 4, the vehicle body 12 is a basically a standard unibody type passenger vehicle body. While the vehicle body 12 is illustrated in the form of a two-door coupe, the sliding rear window 14, the removable rear trunk lid 16 and the movable rear body panel 18 can be used in other body styles. The vehicle body 12 has a passenger cabin (vehicle interior area) with a front seating area 20 and a rear seating area 22. The vehicle interior area of the vehicle body 12 also has an interior cargo (trunk) area 24 disposed rearwardly of the rear seating area 22.

Figure 7:
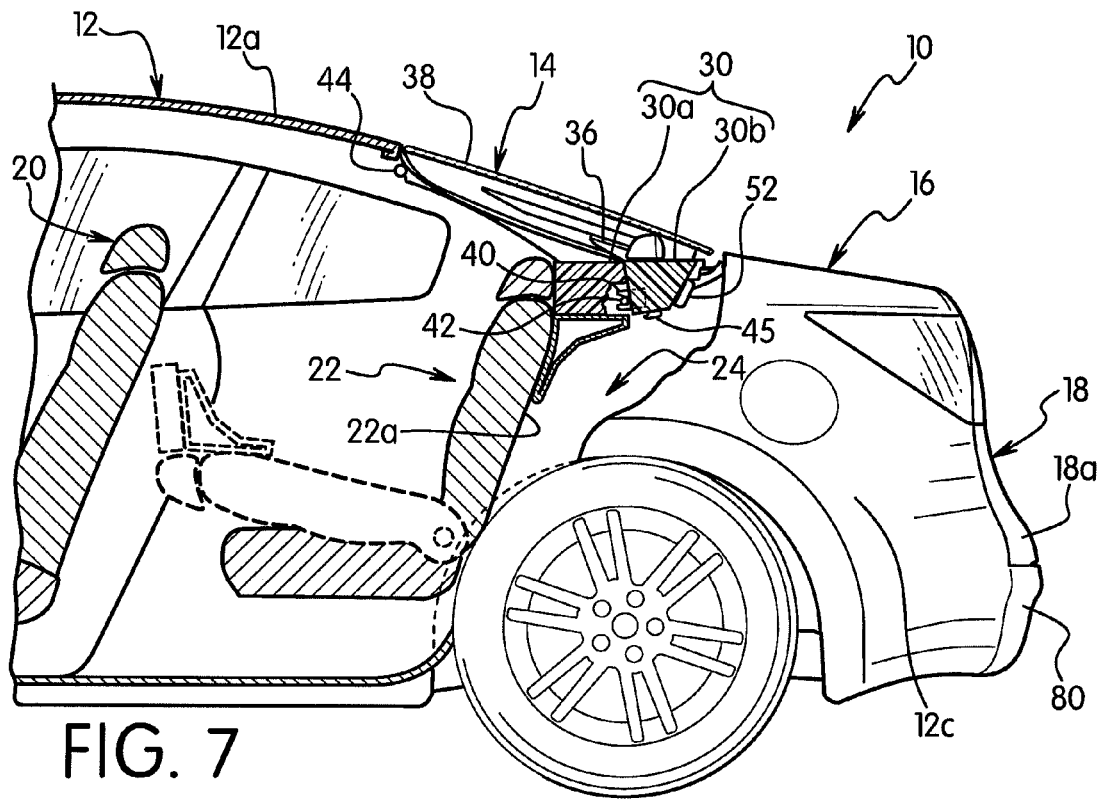
FIG. 7 is a simplified longitudinal cross sectional view of a rear portion of the passenger vehicle illustrated in FIGS. 1 to 6, with the rear window in the down (closed) position, the rear trunk lid in the closed position and the rear panel in the closed position (upright orientation)

Preferably, as seen in FIG. 7, the rear seating area 22 has a rear seat back 22a that is pivotally mounted to the vehicle body 12 for movement between a generally upright orientation and a generally horizontal orientation such that the cargo (trunk) area 24 can be selectively opened to the passenger cabin. The rear seat back 22a can be a single seat back, or a split seat back in which two sections are independently pivotally mounted to move between a generally upright orientation and a generally horizontal orientation. This type of rear seating is conventional and thus, the rear seating will not be discussed and or illustrated in detail herein.

The vehicle body 12 has, among other parts, a roof portion 12a, a pair of rear pillars 12b and a rear body portion 12c. The rear pillars 12b extend between roof portion 12a and the rear body portion 12c. The rear window 14 is slidably attached to the rear pillars 12b to move in an overlapping relationship with the roof portion 12a, as explained below. The removable rear trunk lid 16 is movably attached to the rear body portion 12c by a pair of trunk hinges 26 for movement between the closed position that covers an upper exterior trunk access opening and the open position that exposes the upper exterior trunk access opening to provide access to the interior cargo area through the upper exterior trunk access opening. Also the movable rear body panel 18 is movably attached to the rear body portion 12c between the generally upright orientation (closed position) that covers a rear exterior trunk access opening and a generally horizontal orientation that exposes the rear exterior trunk access opening to provide access to the interior cargo area through the rear exterior trunk access opening.

Figure 6:
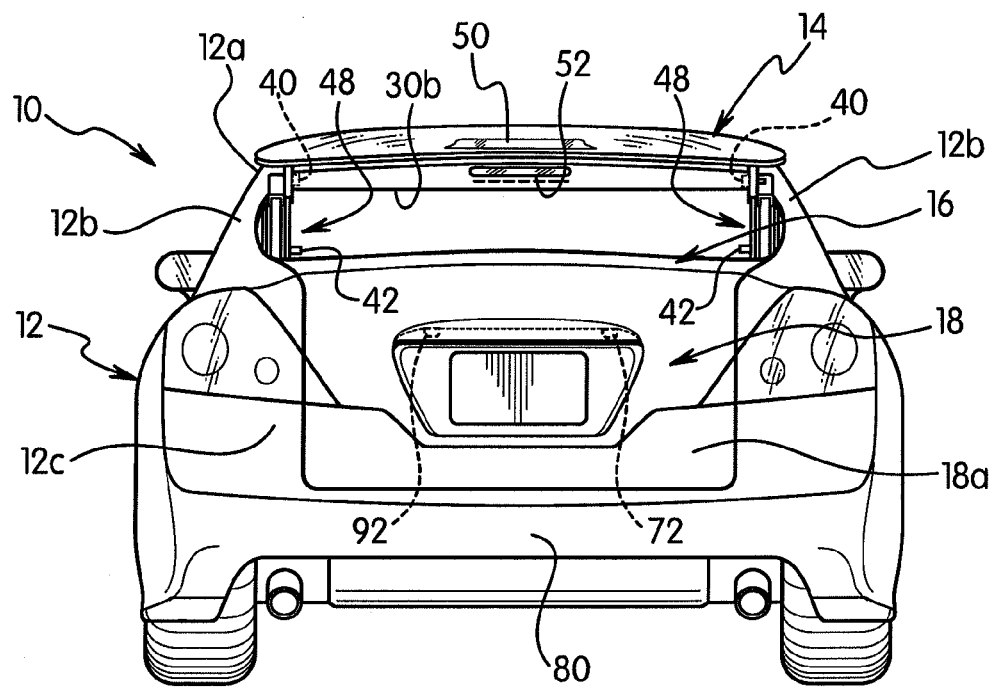
FIG. 6 is a rear elevational view of the passenger vehicle illustrated in FIGS. 1 to 5, with the rear window in the up (open) position.
Figure 8:
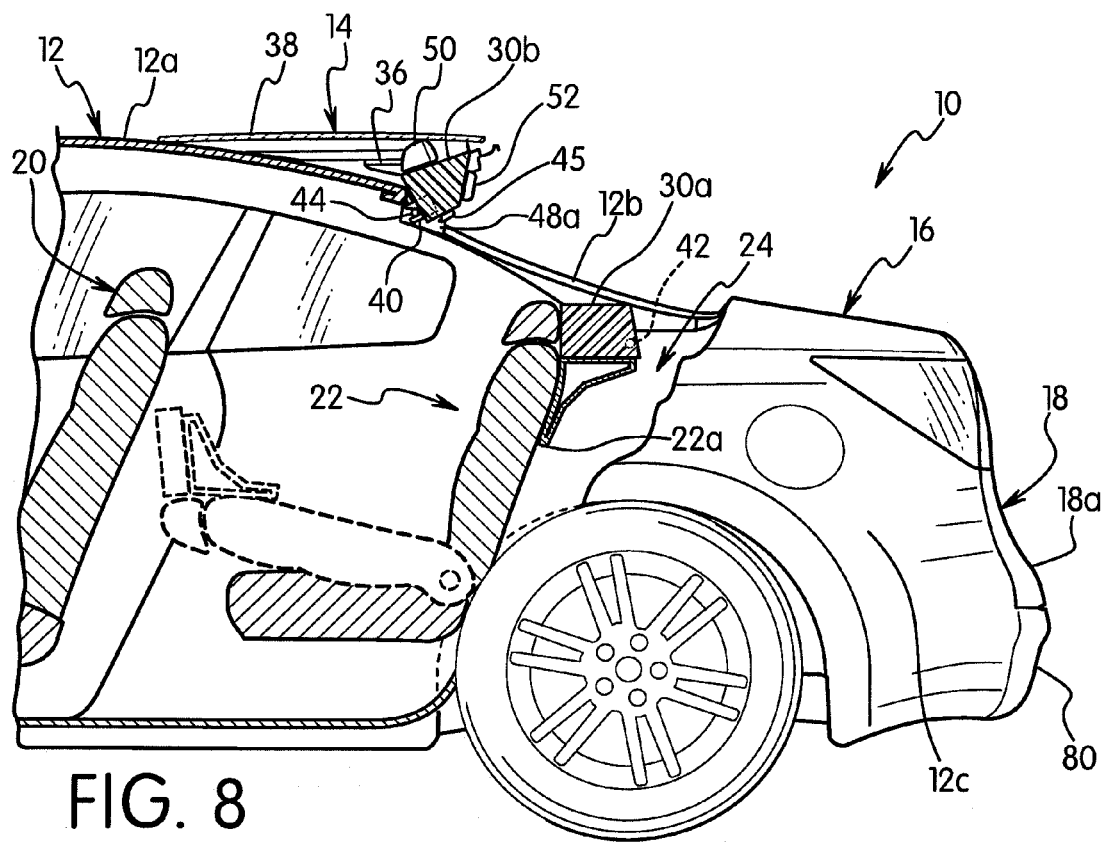
FIG. 8 is a simplified longitudinal cross sectional view, similar to FIG. 7, of the rear portion of the passenger vehicle illustrated in FIGS. 1 to 6, but with the rear window in the up (open) position.

In the illustrated embodiment, as best seen in FIGS. 6 and 8, a rear window opening is defined by a rearward edge of the roof portion 12a, inward edges of the rear pillars 12b and a forward edge of the rear trunk lid 16. The rear window 14 has a rearward edge that mates with the forward edge of the rear trunk lid 16 in the normal driving condition. Also, an upper edge of the movable rear body panel 18 mates with a rearward edge of the rear trunk lid 16. Thus, when the rear window 14 is moved to the open position, the rear trunk lid 16 is removed and the movable rear body panel 18 is moved to the horizontal orientation, the rear window opening, the upper exterior trunk access and the rear exterior trunk access opening form a large single, continuous access opening as seen in FIG. 2.

As seen in FIGS. 12 to 19, the cargo (trunk) area 24 is basically defined by the removable rear trunk lid 16, the movable rear body panel 18, the rear seat back 22a, a parcel shelf 30, an interior floor panel 32 and a pair of interior side panels 34. The rear seat back 22a forms a front panel of the cargo (trunk) area 24, while the parcel shelf 30 and the removable rear trunk lid 16 forms a top panel of the cargo (trunk) area 24.

As seen in FIGS. 7 and 8, the parcel shelf 30 includes a first shelf part 30a that is attached to the rear seat back 22a and a second shelf part 30b that is attached to the rear window 14. Thus, when the rear seat back 22a is pivoted forward to a generally horizontal (down) position (FIG. 15), the first shelf part 30a moves with the rear seat back 22a and the second shelf part 30b remains with the rear window 14. Thus, when the rear seat back 22a (i.e., the front panel of the cargo area 24) is folded in a forward vehicle direction, an interior trunk access opening is provided such that the passenger cabin (vehicle interior area) and the cargo area 34 below the exterior trunk opening are connected. Similarly, when the rear window 14 is slid forward to an open position (FIG. 8), the second shelf part 30b moves with the rear window 14 and the first shelf part 30a remains with the rear seat back 22a.

Figure 12:
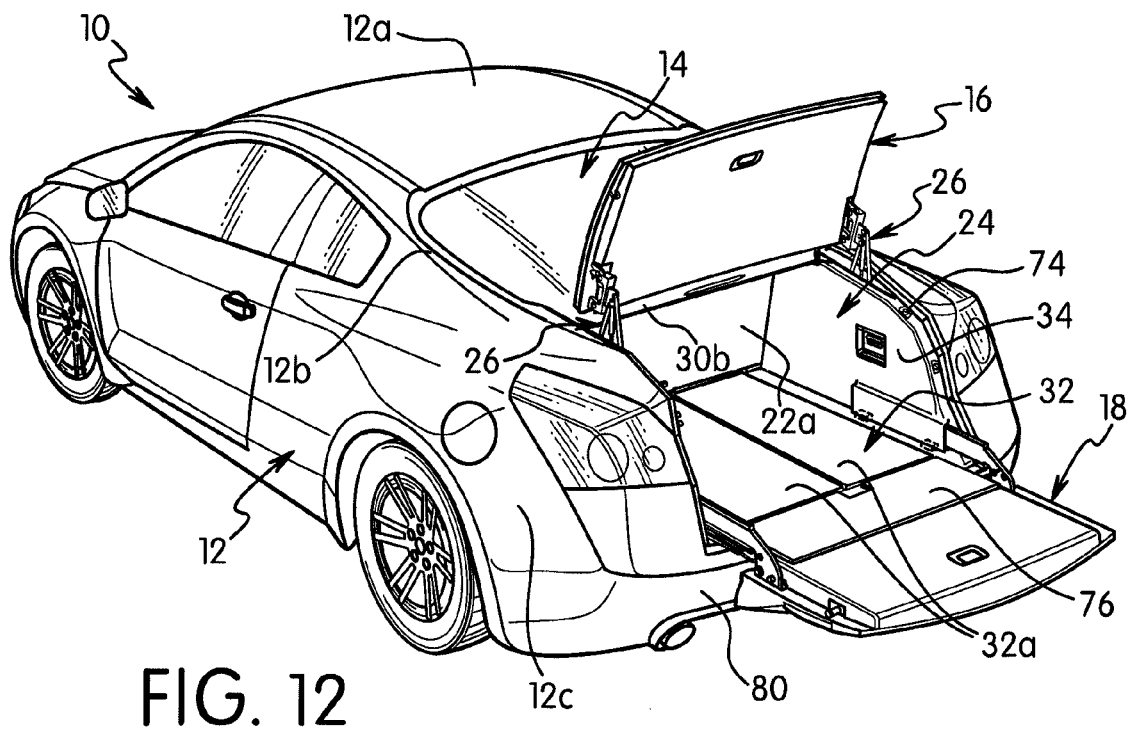
FIG. 12 is a rear end perspective view of the passenger vehicle illustrated in FIGS. 1 to 8, with the rear trunk lid in the up (open) position and the rear panel in the open position (horizontal orientation)
Figure 13:
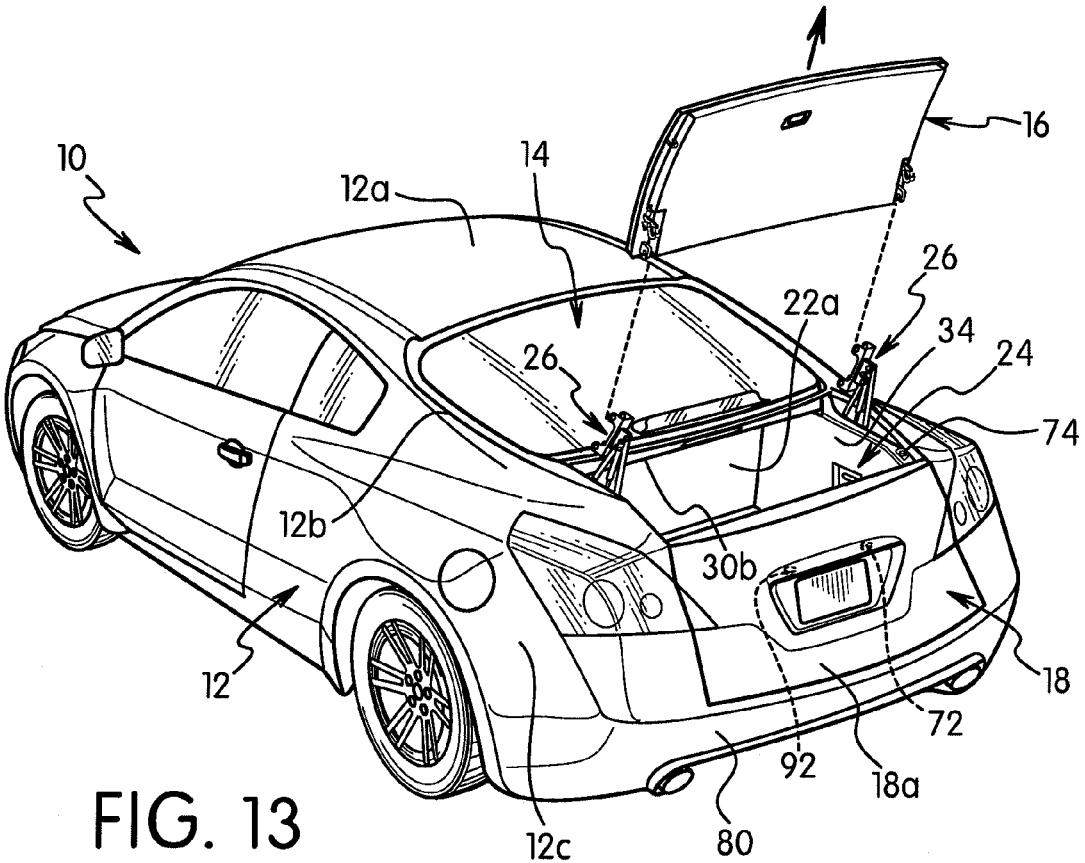
FIG. 13 is a rear end perspective view of the passenger vehicle illustrated in FIGS. 1 to 8 and 12 with the rear trunk lid in the process of being removed.
Figure 14:
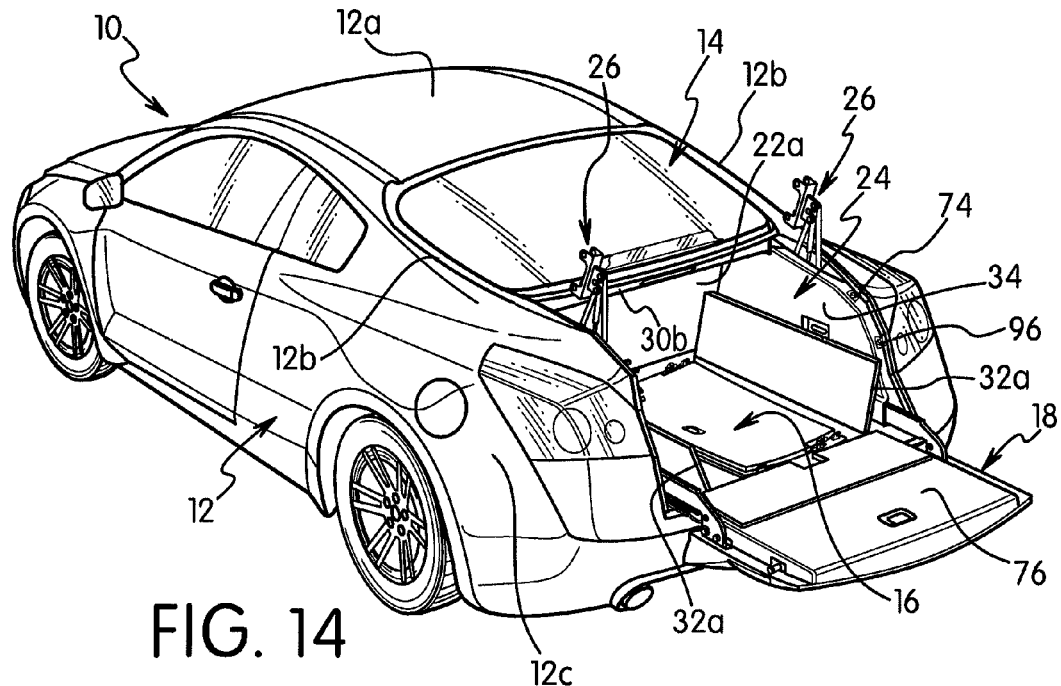
FIG. 14 is a rear end perspective view of the passenger vehicle illustrated in FIGS. 1 to 8, with the rear trunk lid removed and the rear trunk lid in the process of being stored in the floor compartment of the trunk.
Figure 15:
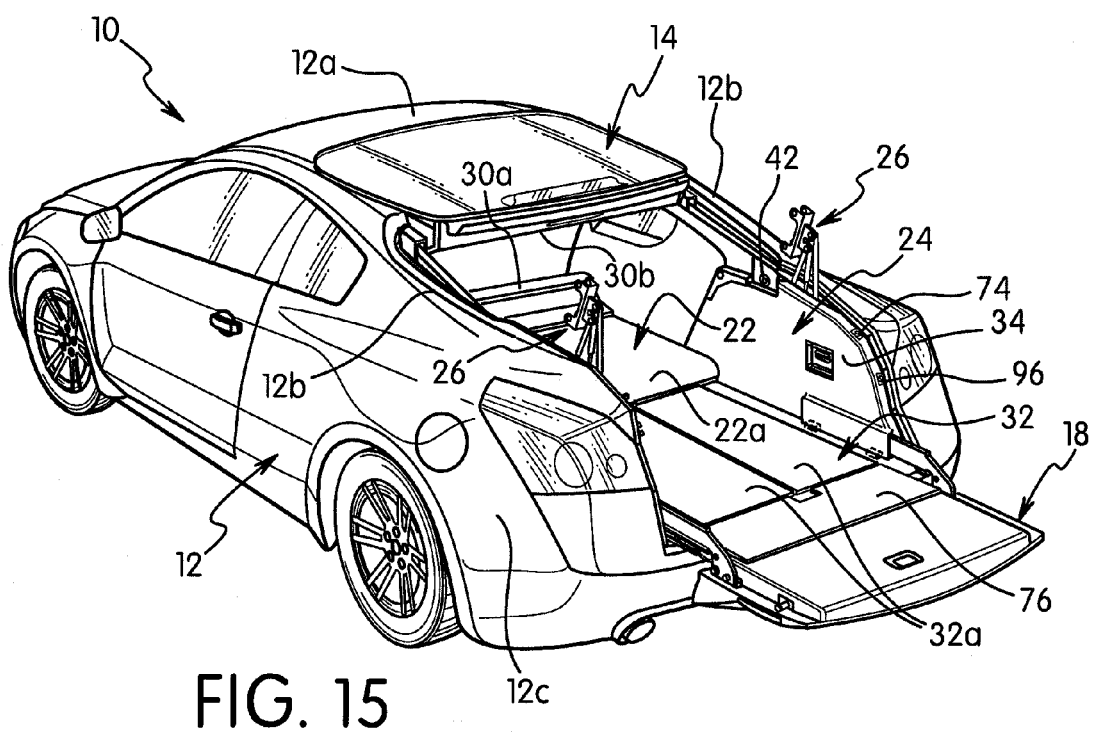
FIG. 15 is a rear end perspective view of the passenger vehicle illustrated in FIGS. 1 to 8, with the rear trunk lid being removed and stored in the floor compartment of the trunk.
Figure 16:
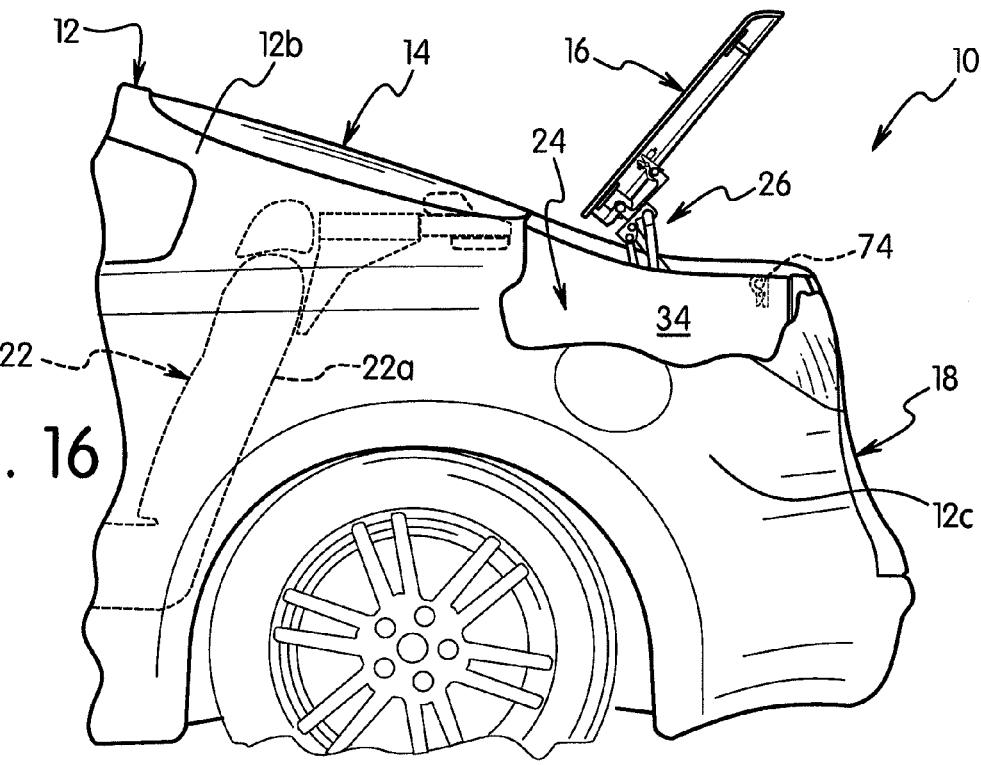
FIG. 16 is a simplified longitudinal cross sectional view of a rear portion of the passenger vehicle illustrated in FIGS. 1 to 8, with the rear trunk lid in the up (open) position.
Figure 17:
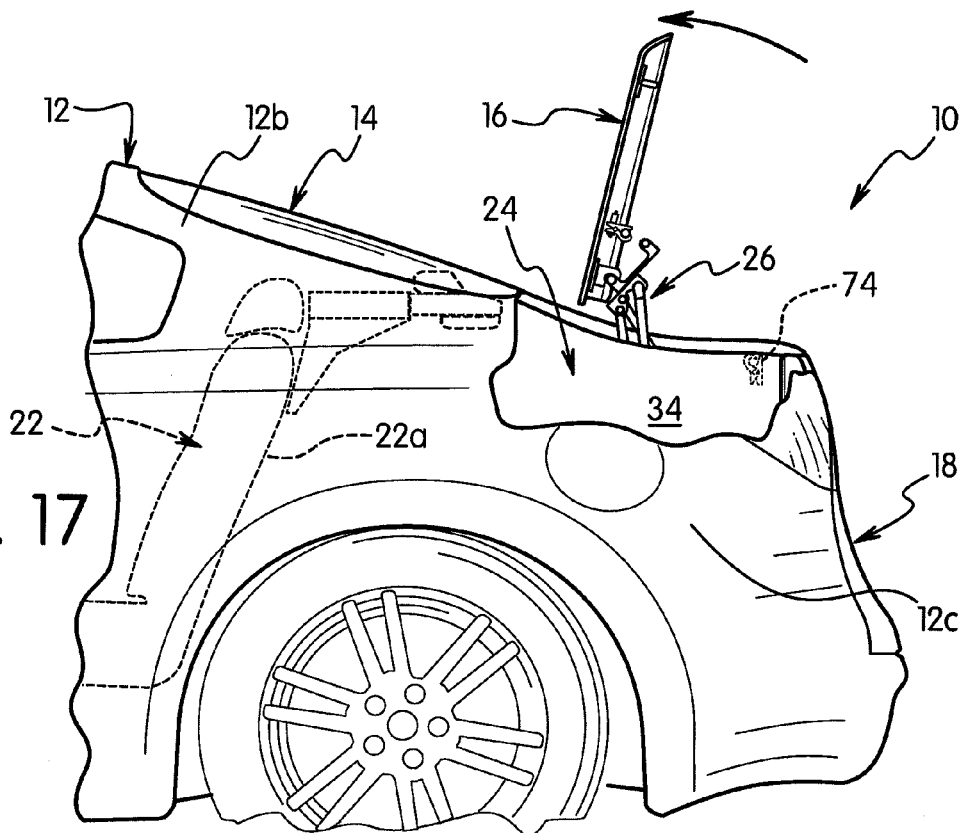
FIG. 17 is a simplified longitudinal cross sectional view, similar to FIG. 16, of the rear portion of the passenger vehicle illustrated in FIGS. 1 to 8, but with the rear trunk lid in the process of being removed.
Figure 18:
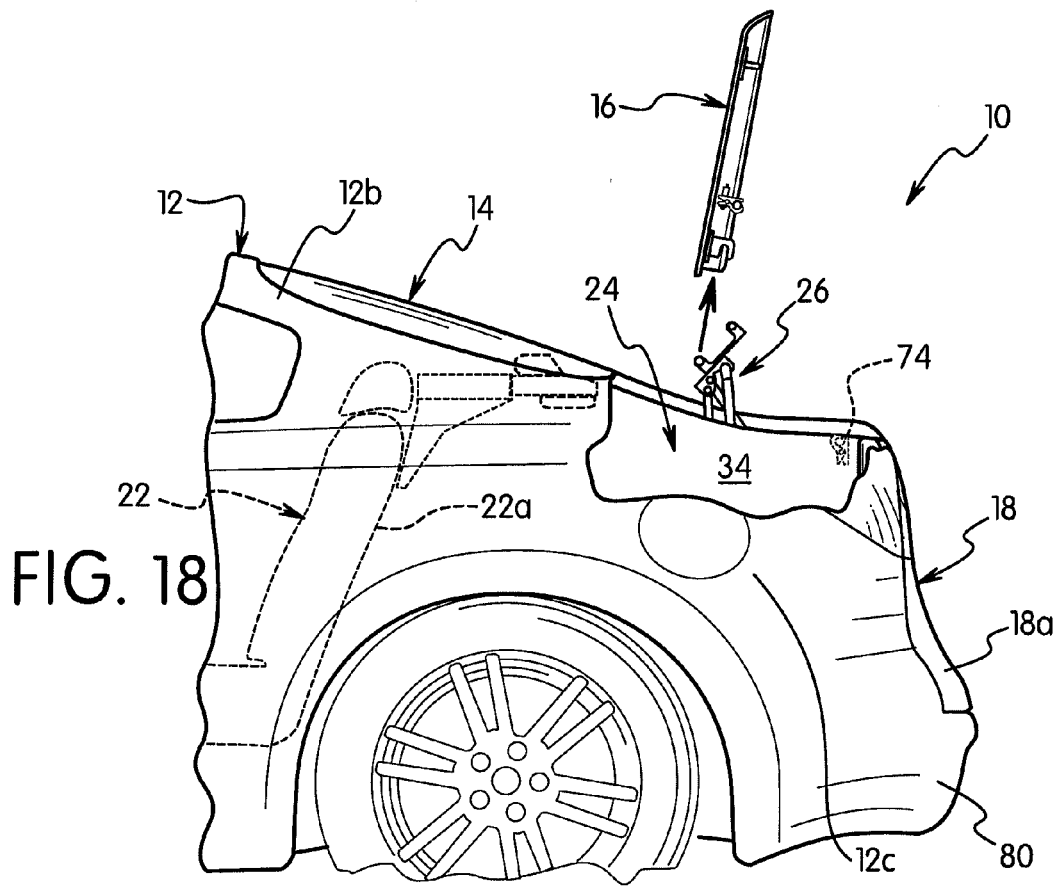
FIG. 18 is a simplified longitudinal cross sectional view, similar to FIGS. 16 and 17, of the rear portion of the passenger vehicle illustrated in FIGS. 1 to 8 and 12 to 17, but with the rear trunk lid removed.
Figure 19:
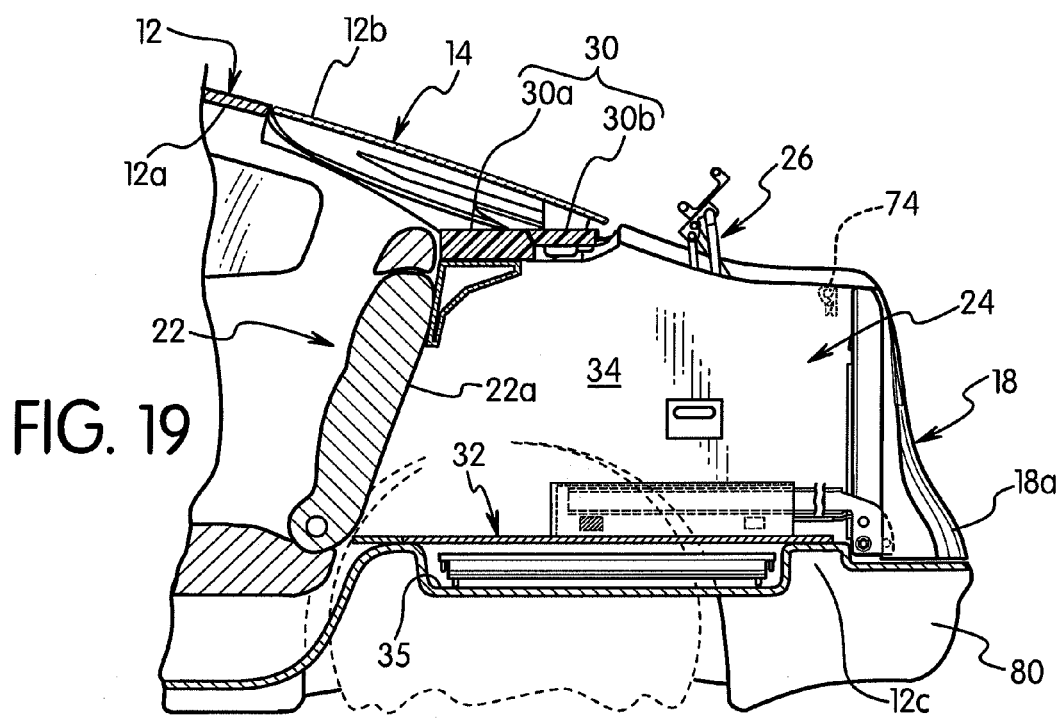
FIG. 19 is a simplified longitudinal cross sectional view, similar to FIGS. 16 to 18, of the rear portion of the passenger vehicle illustrated in FIGS. 1 to 8, but with the rear trunk lid removed and stored in the floor compartment.

As seen in FIGS. 12, 14 and 15, the interior floor panel 32 includes a pair of compartment doors 32a that cover a trunk lid receiving cavity or compartment 35. The compartment doors 32a are preferably hinged to the remainder of the interior floor panel 32 to move between a down or closed position covering the trunk lid receiving compartment 35 and an up or open position exposing the trunk lid receiving compartment 35. The trunk lid receiving compartment 35 is dimensioned for storing the trunk lid 16 beneath the interior floor panel 32, when the trunk lid 16 is removed from its hinges 26.

Turning now to FIGS. 5 to 9, the operation of the rear window 14 will now be discussed. Increased cargo space is provided by releasing the rear window 14 and then sliding the rear window 14 up over the roof portion 12a of the vehicle body 12. In other words, the rear window 14 is movably with respect to the vehicle body 12 between a closed position that covers a rear window opening and an open position that exposes the rear window opening. The rear window 14 basically includes the second shelf part 30b, a frame 36 attached to the second shelf part 30b and a glass panel 38 attached to the frame 36. The glass panel 38 of the rear window 14 has a forward edge and a rearward edge. As seen in FIG. 8, the rearward edge of the glass panel 38 is higher than the forward edge of the glass panel 38 when the rear window 14 is in the closed position.

The second shelf part 30b of the parcel shelf 30 serves as a carrier for the frame 36 and the glass panel 38. The second shelf part 30b of the parcel shelf 30 includes a pair of latches 40 to lock the glass panel 38 in both the up (open) and down (closed) positions. The latches 40 are conventional latches that are commonly used in the automobile industry, and thus, the latches 40 will not be discussed and/or illustrated in detail herein. One of the latches 40 is disposed on a first lateral side of the parcel shelf 30, while the other of the latches 40 is disposed on a second (opposite) lateral side of the parcel shelf 30. The latches 40 engage a set of lower pins 42 on the rear pillars 12b to retain the rear window 14 in the down (closed) position. The latches 40 also engage a set of upper pins 44 near the rearward edge of the roof portion 12a to retain the rear window 14 in the up (open) position. Thus, the latches 40 and the pins 42 and 44 form a latching mechanism for retaining the glass panel 38 in both of the closed and open positions. A release handle 45 is located on the bottom surface of the second shelf part 30b of the parcel shelf 30 to operate the latches 40 in a conventional manner, e.g., using conventional cables.

Figure 9:
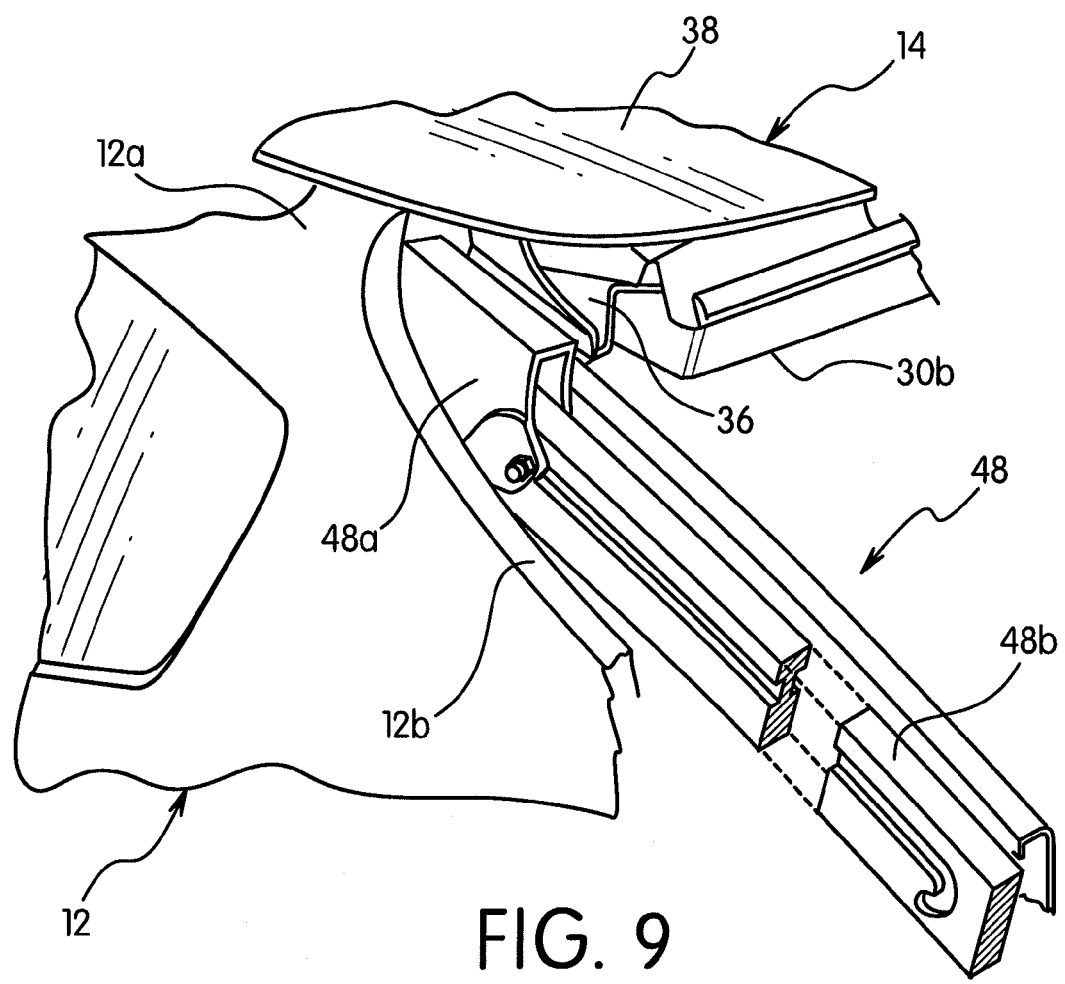
FIG. 9 is a partial rear perspective view of the driver's side rear pillar illustrated in FIGS. 1 to 8, with the rear window in the up (open) position.

As seen in FIGS. 6 and 9, the track systems 48 constitute a sliding mechanism for slidably mounting the rear window 14 to the vehicle body 12. Basically, each of the track systems 48 includes a slide 48a mounted to the second shelf part 30b of the parcel shelf 30 and a rails 40 mounted to one of the rear pillars 12b of the vehicle body 12. The rails 48b are preferably mounted within the rear pillars 12b of the vehicle body 12 so that the track systems 48 are not visible when the glass panel 38 in the down (closed) position. In the illustrated embodiment, the rails 48b have grooves that receive pins of the slides 48a for guiding the glass panel 38 between the up (open) and down (closed) positions. Preferably, the grooves are configured so that the glass panel 38 initially moves outwardly from the vehicle body 12 when the glass panel 38 is moved forwardly from and the down (closed) position to the up (open) position. Thus, the glass panel 38 pops outwardly from the rear window opening defined by the roof portion 12a so that the glass panel 38 slides over the roof portion 12a when the glass panel 38 is in the up (open) position. Preferably, when the glass panel 38 is in the up (open) position, a majority of the glass panel 38 overlaps the roof portion 12a.

Figure 5:
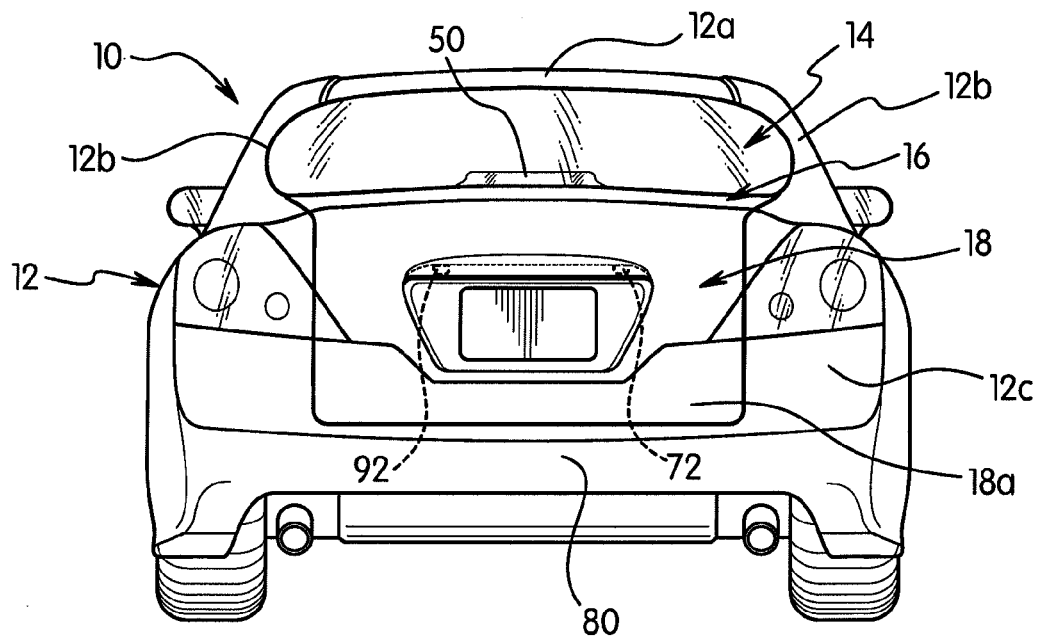
FIG. 5 is a rear elevational view of the passenger vehicle illustrated in FIGS. 1 to 4, with the rear window in the down (closed) position, the rear trunk lid in the closed position and the rear panel in the closed position (upright orientation)

As seen in FIGS. 2, 5 and 6, the second shelf part 30b of the parcel shelf 30 includes a stop lamp 50 and an interior light 52. The stop lamp 50 functions as a center high mount stop lamp when the rear window 14 in both the up (open) and down (closed) positions. In other words, when the glass is in the down (normal) position the stop lamp 50 operates similar to any normal passenger car. However when the glass panel 38 is slid forward, the stop lamp 50 is also moved forward and up over the rearward edge of the roof portion 12a. In this forward position the stop lamp 50 can still operate in its intended manner similar to a pickup truck such that the stop lamp 50 is near the highest point on the passenger vehicle 10. Thus, the stop lamp 50 is visible to rearward vehicles of the passenger vehicle 10 while the rear window 14 is in the open position so that light emitted from the stop lamp 50 during is visible to the rearward vehicles braking. The interior light 52 also has dual modes of operation in that the interior light 52 is used as a trunk light when the rear window 14 is in the normal closed position. However, when the rear window 14 is in the opened, the interior light 52 is now raised higher and serves as a cargo light for the cargo area.

The sliding operation of the rear window 14 is performed manually by physically pushing the glass panel 38 over the roof portion 12a of the vehicle body 12 by hand. However, a motor can be provided to move the glass panel 38 in both the up (open) and down (closed) positions, if needed and/or desired.

Figure 10:
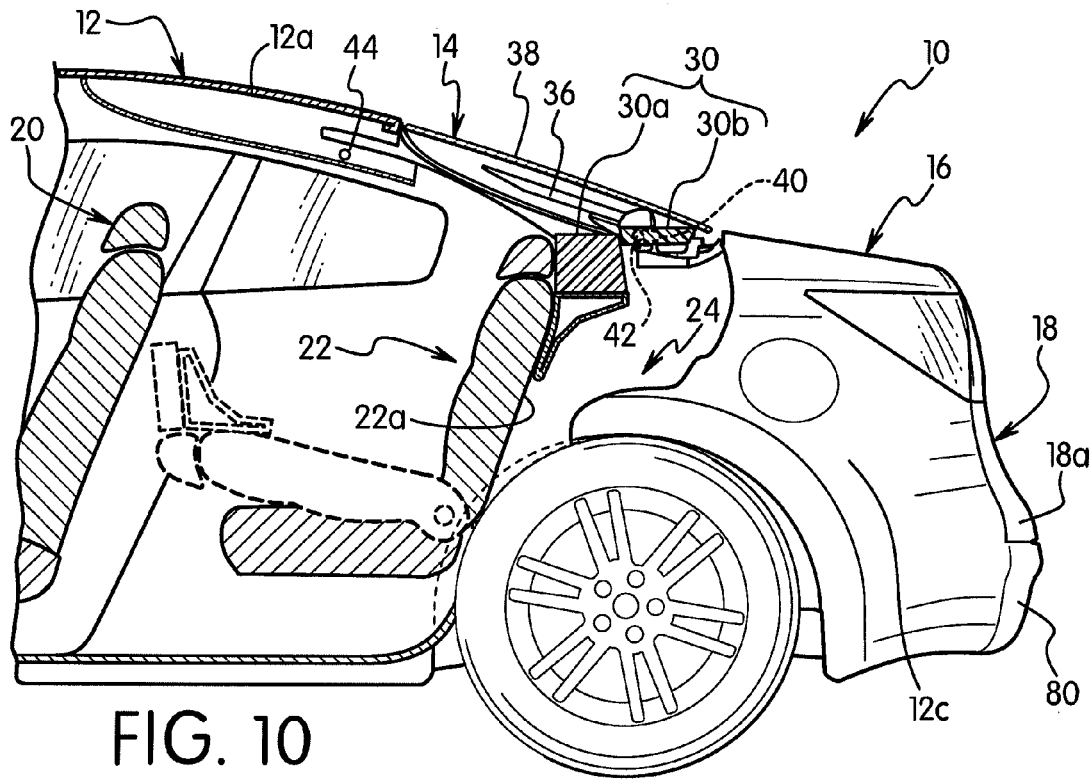
FIG. 10 is a simplified longitudinal cross sectional view of a rear portion of a passenger vehicle with an alternate sliding rear window in the down (closed) position.
Figure 11:
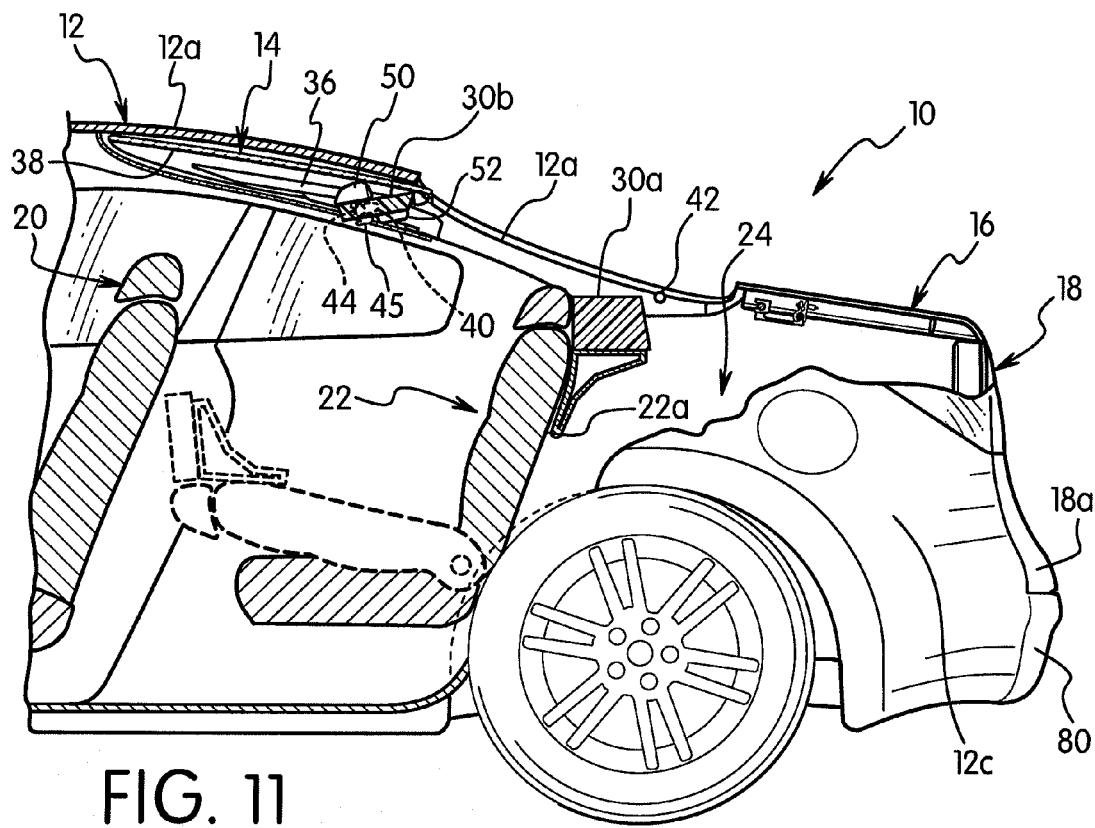
FIG. 11 is a simplified longitudinal cross sectional view, similar to FIG. 9, of the rear portion of the passenger vehicle illustrated in FIG. 9, but with the alternate sliding rear window in the up (open) position.

In the illustrated embodiment, the rear window 14 is slid over the roof portion 12a using a pair of track systems 48, which are contained in the rear pillars 12b of the vehicle body 12. Alternatively, the rear window 14 can slides under the roof portion 12a when the rear window 14 is in the open position as seen in FIGS. 10 and 11. In this case, the track systems would be similar to a sunroof, but moving in a reverse direction.

Turning now to FIGS. 12 to 22, the operation of the rear trunk lid 16 will now be discussed. Increased cargo space is provided by removing the rear trunk lid 16 without the use of tools. The rear trunk lid 16 operates in a normal manner for every day use, but is removable for the times when increased cargo area is needed. The rear trunk lid 16 can be detached from the vehicle body 12 without the use of tools, and stored under the interior floor panel 32 (trunk floor). This easy removal and self contained storage allows spontaneous use of the enhanced utility, no planning is needed by the driver.

Figure 20:
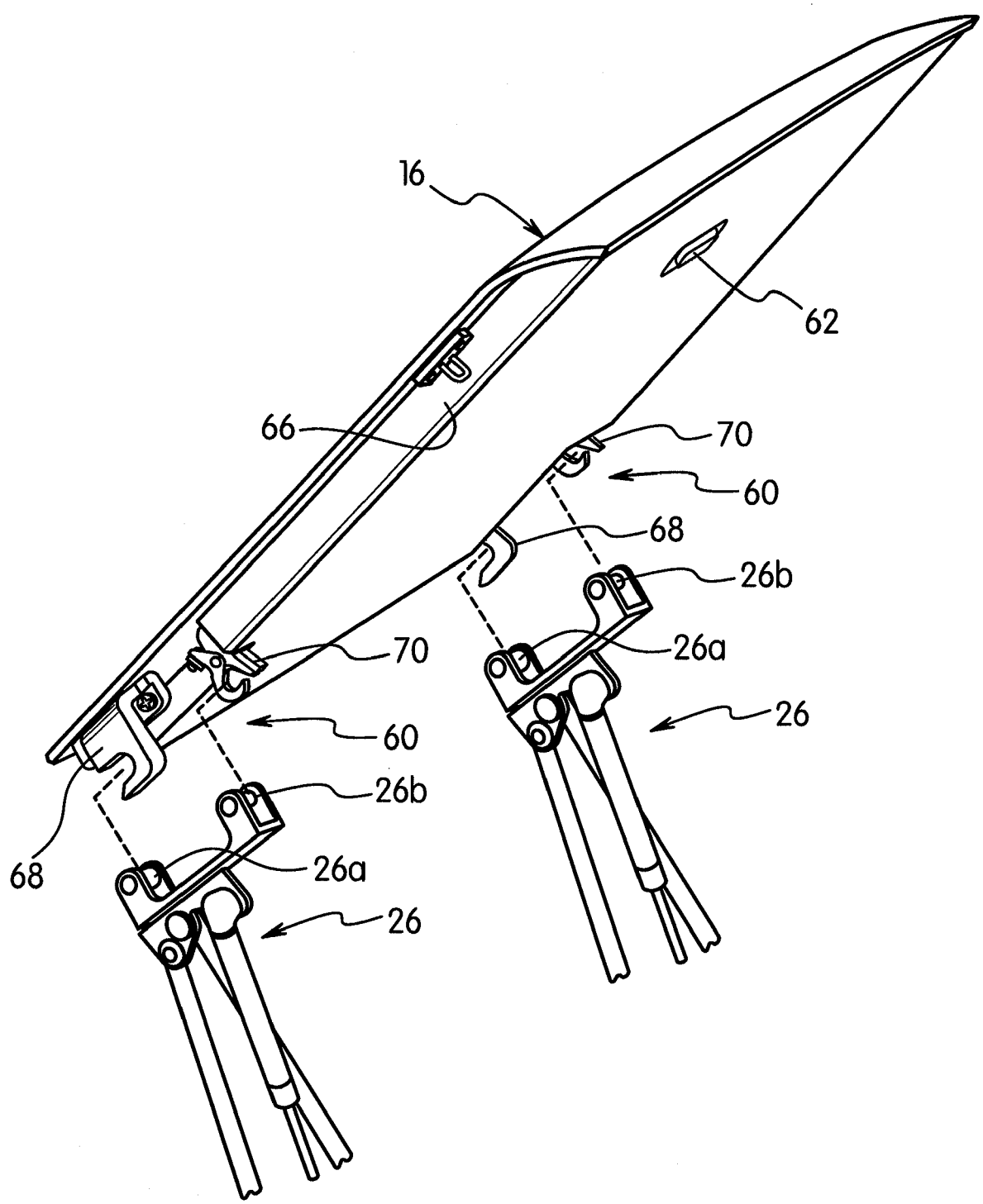
FIG. 20 is a simplified exploded perspective view of the rear trunk lid detached from the hinges of the vehicle body.
Figure 21:
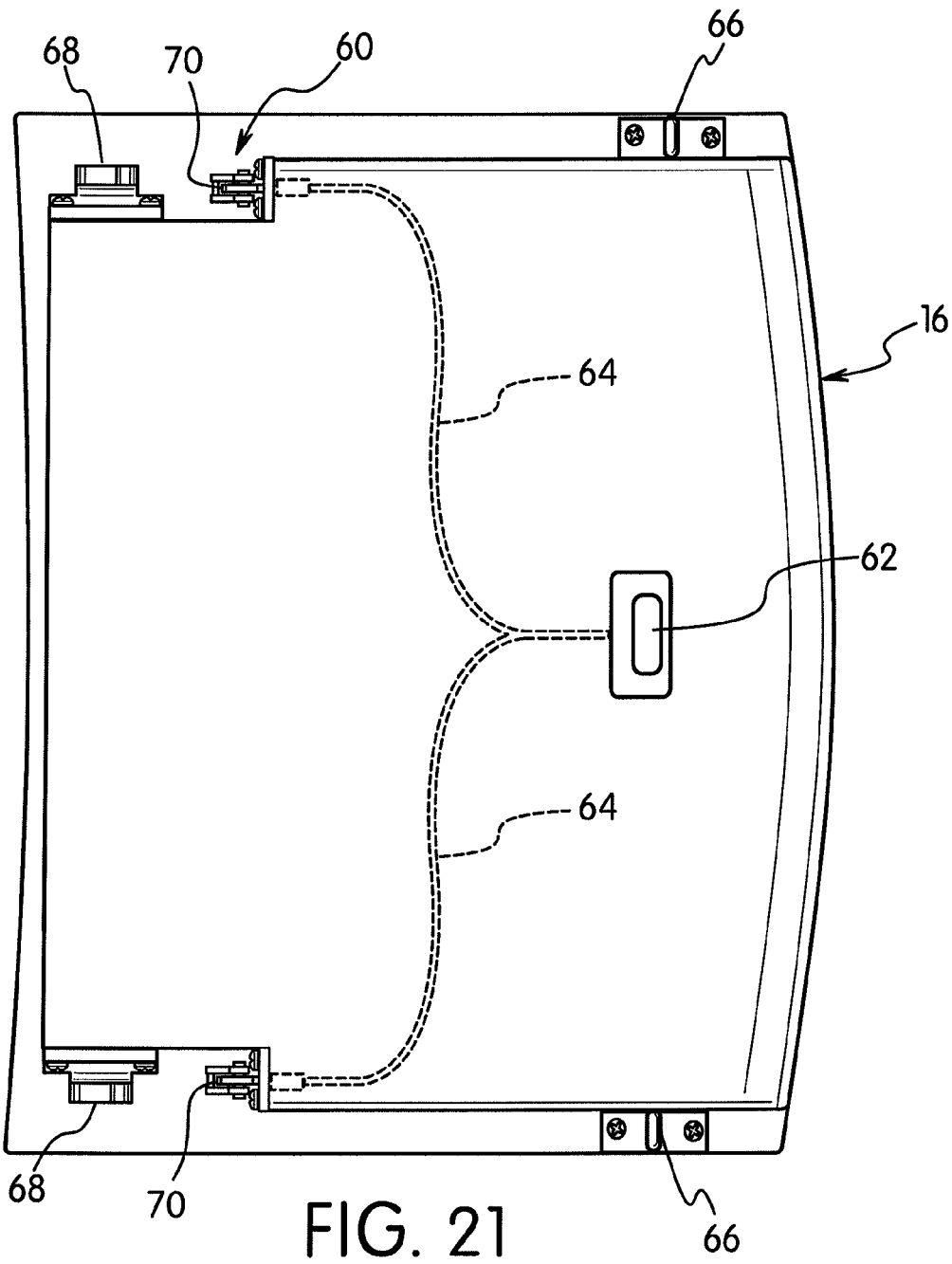
FIG. 21 is a simplified bottom plan (interior) view of the rear trunk lid of the passenger vehicle illustrated in FIGS. 1 to 8.
Figure 22:
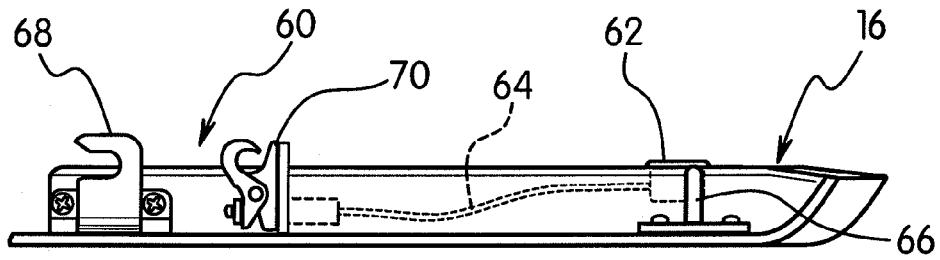
FIG. 22 is a lateral side edge view of the rear trunk lid illustrated in FIG. 21.
Figure 23:
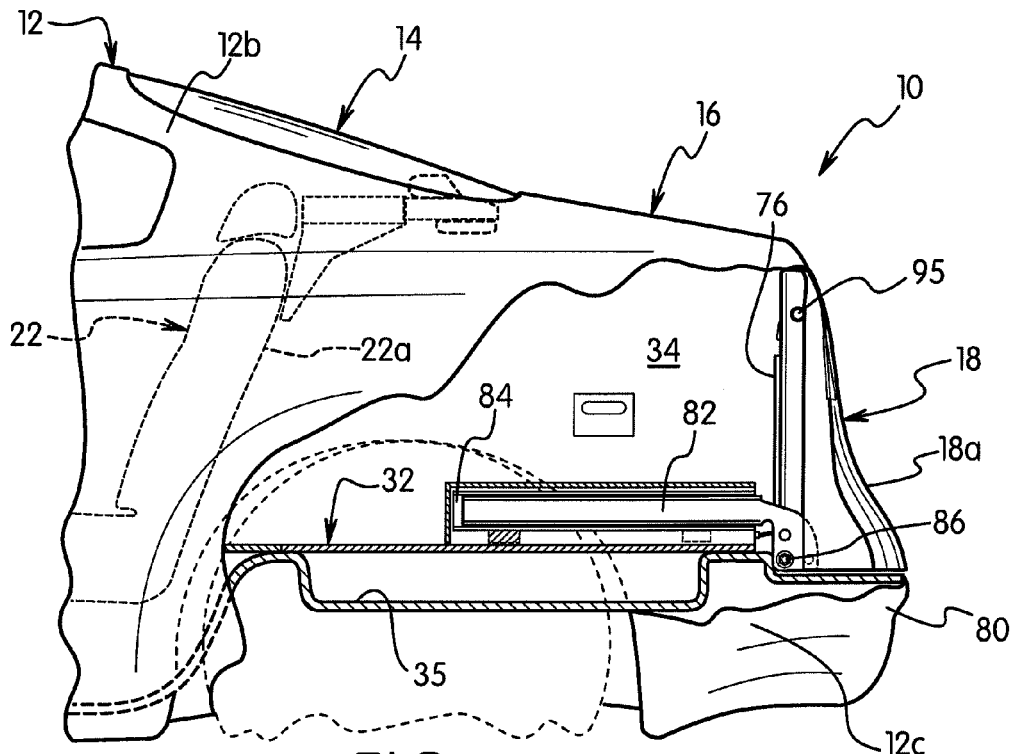
FIG. 23 is a simplified longitudinal cross sectional view of the rear portion of the passenger vehicle illustrated in FIGS. 1 to 8 showing the pivotal rear panel locked in the closed position (upright orientation)
Figure 24:
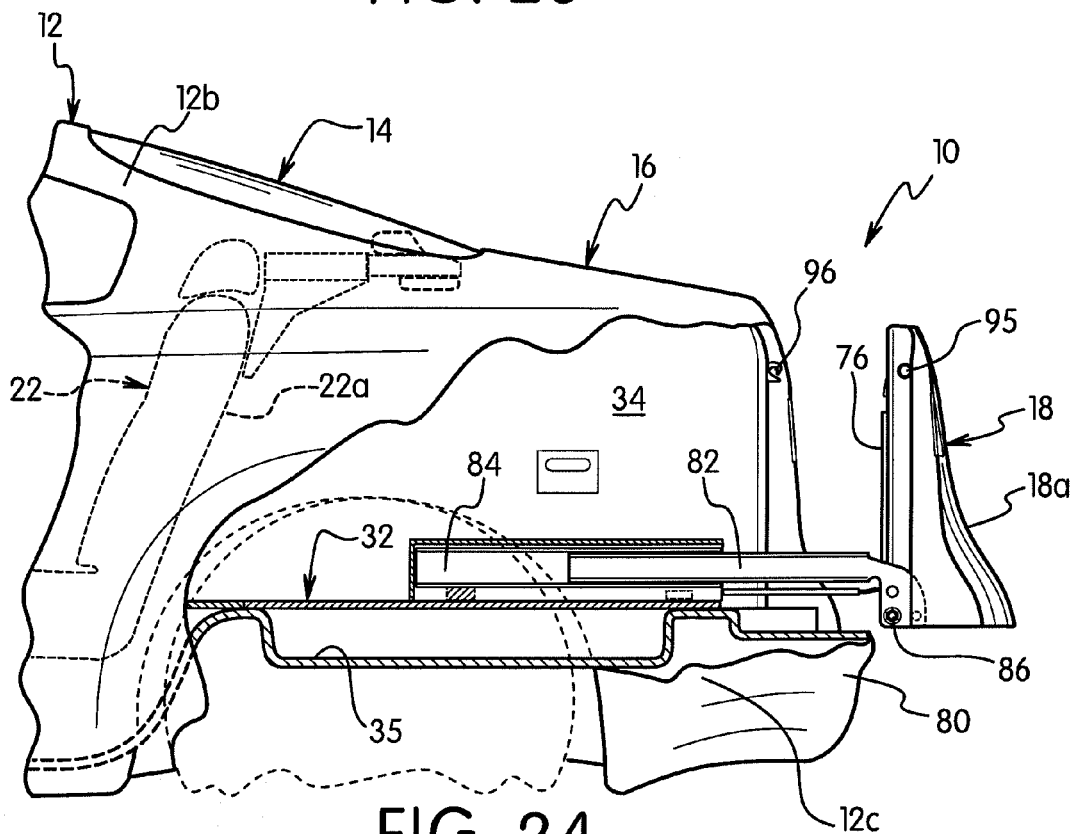
FIG. 24 is a simplified longitudinal cross sectional view, similar to FIG. 23, of the rear portion of the passenger vehicle illustrated in FIGS. 1 to 8 showing the pivotal rear panel locked in the extended position.
Figure 25:
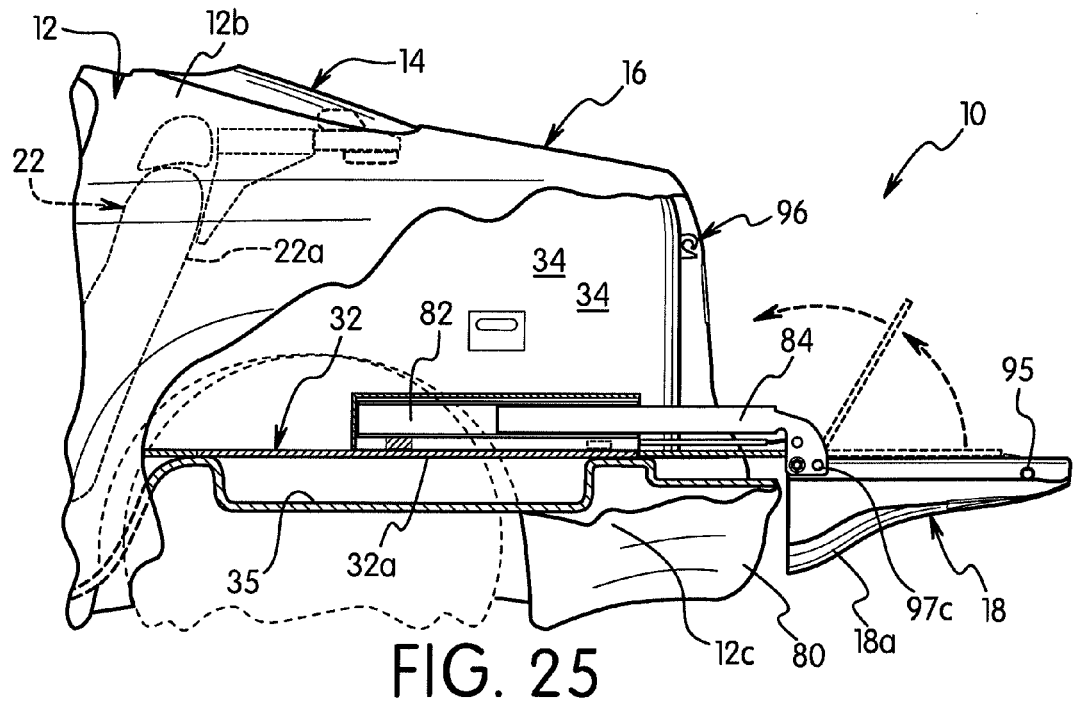
FIG. 25 is a simplified longitudinal cross sectional view, similar to FIGS. 23 and 24, of the rear portion of the passenger vehicle illustrated in FIGS. 1 to 8 showing the pivotal rear panel locked in the open position (horizontal orientation)
Figure 26:
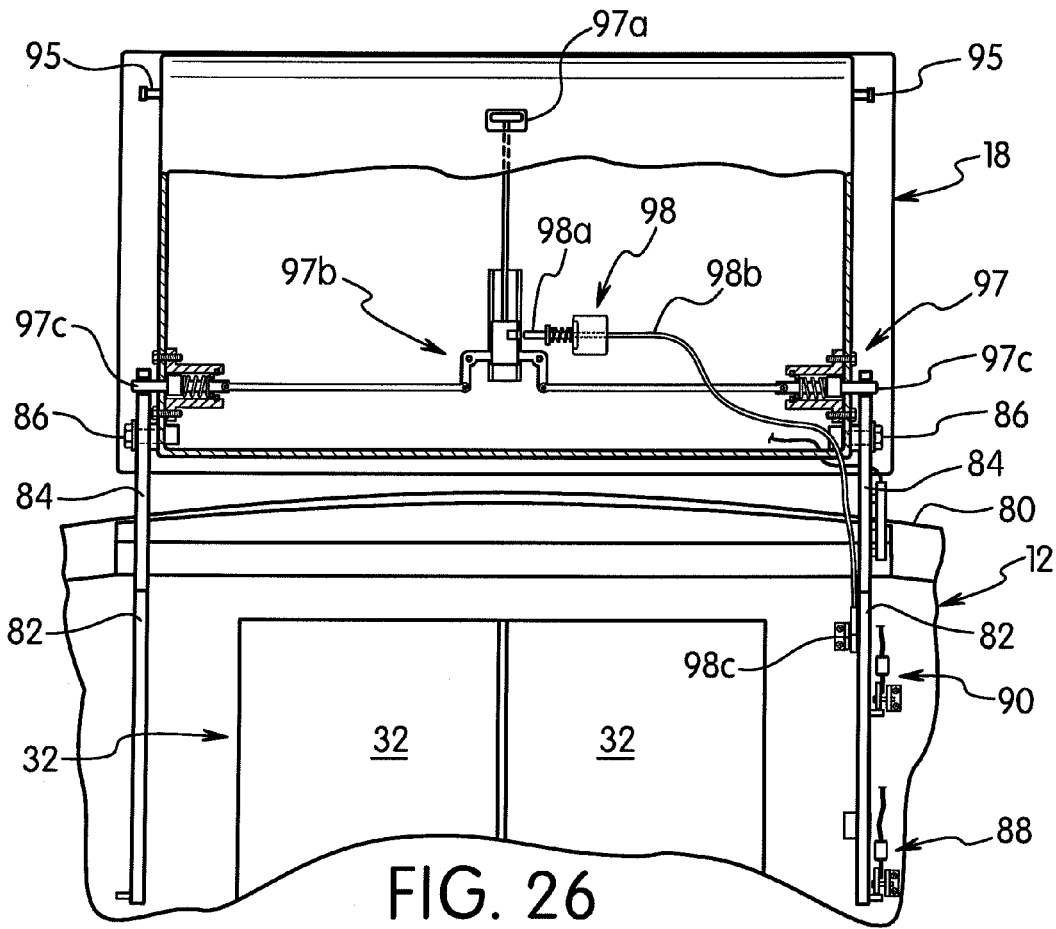
FIG. 26 is a simplified top plan view of a rear portion of the passenger vehicle illustrated in FIGS. 1 to 8, with the pivotal rear panel locked in the open position (horizontal orientation)
Figure 27:
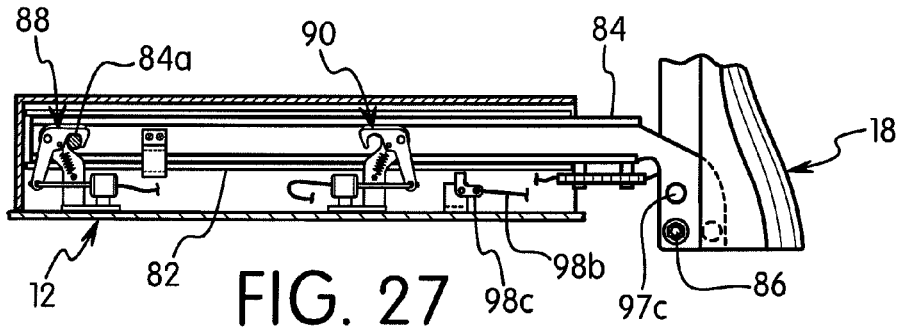
FIG. 27 is a simplified side elevational view of one of the rear panel sliding mechanism in a forward locked position for holding the pivotal rear panel in the closed position.
Figure 28:
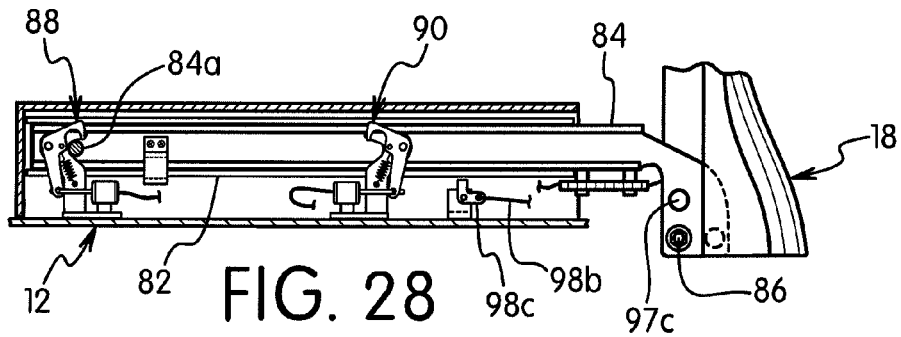
FIG. 28 is a simplified side elevational view, similar to FIG. 27, of one of the rear panel sliding mechanism in the unlocked position for releasing the pivotal rear panel to slide rearwardly.
Figure 29:
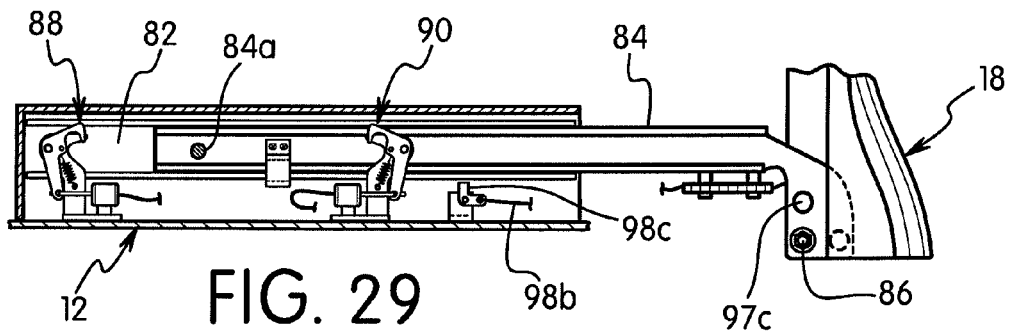
FIG. 29 is a simplified side elevational view, similar to FIGS. 27 and 28, of one of the rear panel sliding mechanism with the sliding rails 84 moved rearwardly to extend the pivotal rear panel rearwardly of the rear end of the vehicle.

Basically, as seen in FIGS. 20 to 22, the rear trunk lid 16 includes a pair of hinge attachment arrangements 60, a manually operated hinge release handle 62 operatively coupled to the hinge attachment arrangements 60 via a pair of release cables 64 and a pair of strikers 66 for latching the rear trunk lid 16 to the vehicle body 12. The hinge attachment arrangements 60, the manually operated hinge release handle 62 and the release cables 64 constitute a tool free hinge release mechanism for removing the rear trunk lid 16 without using tools. The tool free hinge release mechanism is built-in to the rear trunk lid 16 as a self-contained unit.

One of the hinge attachment arrangements 60 is disposed on a first lateral side of the body of the rear trunk lid 16, while the other of the hinge attachment arrangements 60 is disposed on a second (opposite) lateral side of the body of the rear trunk lid 16. Each of the hinge attachment arrangements 60 includes a hook 68 and a latch 70 for releasably connecting the rear trunk lid 16 from a pair of pins 26a and 26b of each of the trunk hinges 26. The trunk hinges 26 and the hinge attachment arrangements 60 constitute a hinge arrangement pivotally coupling the rear trunk lid 16 to the vehicle body 12 with the rear trunk lid 16 being movable between a closed position that covers the exterior trunk access opening and an open position that exposes the exterior trunk access opening to provide access to the cargo area 24 through the exterior trunk access opening. Preferably, the vehicle body 12 has a unitized vehicle body part defining part of the upper trunk access opening with the hinges 26 pivotally coupled to the unitized vehicle body part and the hinge attachment arrangements 60 fixed to an interior part of the rear trunk lid 16. Alternatively, in certain applications, the trunk hinges 26 can be attached to a parcel shelf if needed and/or desired.

To remove the rear trunk lid 16, the operator first opens the rear trunk lid 16. In the illustrated embodiment, an electronic trunk release button 72 (see, FIGS. 1, 5, 6 and 13) is provided on the movable rear body panel 18 under the eyebrow of the license plate for electronically operating a pair of trunk latches 74 located on the rear end of the vehicle body 12. Once the operator pushes the trunk release button 72, the trunk latches 74 release the strikers 66 so that the rear trunk lid 16 pops open under the force of a spring (not shown). Next, the operator grabs the rear trunk lid 16 using two hands with one hand on the forward edge of the rear trunk lid 16 and the other hand on the rear edge of the rear trunk lid 16 and on the manually operated hinge release handle 62. The operator then actuates the manually operated hinge release handle 62 to release the two latches 70 from the rear pins 26b of the trunk hinges 26. The two latches 70 are linked together via the release cables 64, such that the latches 70 are operated by using the single release handle 62. The release handle 62 is located on the interior surface of the rear trunk lid 16. This release handle 62 releases both of the trunk hinges 26 simultaneously when operated. Separation is achieved by first releasing the two latches 70 from the rear pins 26b of the trunk hinges 26, and then pivoting the hooks 68 of the rear trunk lid 16 on the front pins 26a of the trunk hinges 26, and then finally, moving the hooks 68 of the rear trunk lid 16 rearwardly off the front pins 26a of the trunk hinges 26. When the rear trunk lid 16 is released from the vehicle body 12 by separating the rear trunk lid 16 from its trunk hinges 26, the trunk hinges 26 remain attached to the vehicle body 12. Once the rear trunk lid 16 is removed from the trunk hinges 26, the rear trunk lid 16 is stored under the floor panel in the trunk lid receiving compartment 35. The trunk lid receiving compartment 35 is preferably contoured to fit the rear trunk lid 16.

To re-attach the rear trunk lid 16 to the trunk hinges 26, the rear trunk lid 16 is first removed from the trunk lid receiving compartment 35. Next, the operator aligns the hooks 68 of the rear trunk lid 16 on the front pins 26a of the trunk hinges 26 and the rear trunk lid 16 is rotated downwardly so that the latches 70 of the rear trunk lid 16 are aligned with their respective rear pins 26b of the trunk hinges 26. Now the rear trunk lid 16 is rotated downward slightly until both of the latches 70 of the rear trunk lid 16 snap into place on the rear pins 26b of the trunk hinges 26. Thus, the rear trunk lid 16 snaps into place, no actuation of the latches 70 is necessary. Once the rear trunk lid 16 is reattached without tools, the rear trunk lid 16 operates normally.

Turning now to FIGS. 23 to 30, the operation of the movable rear body panel 18 will now be discussed. By separating the movable rear body panel 18 from a rear panel area of the vehicle body 12 additional cargo area can be achieved. In the main embodiment, the movable rear body panel 18 forms a rear exterior panel surface 18a of the vehicle 10. The rear exterior panel surface 18a of the movable rear body panel 18 mates with the rear exterior body surface of the vehicle body 12 at both lateral side edges of the movable rear body panel 18 and the bottom ledge of the movable rear body panel 18. The upper edge of the movable rear body panel 18 mates with rear edge of the rear trunk lid 16. The rear exterior panel surface 18a is convexly curved with respect to a vertical center plane of the vehicle 10.

Since the rear exterior panel surface 18a is convexly curved and the bottom ledge of the movable rear body panel 18 mates closely with the bumper fascia 80 of the vehicle 10, it is necessary to mount the movable rear body panel 18 so that the bottom ledge of the movable rear body panel 18 is moved rearwardly of the bumper fascia 80 of the vehicle 10 when the movable rear body panel 18 is moved from an upright orientation to a horizontal orientation. Thus, in the main embodiment, the movable rear body panel 18 is designed to first move rearwardly with respect to the vehicle body 12 from a retracted (closed) position to an extended (open) position, with the bottom ledge of the movable rear body panel 18 being moved rearwardly of the bumper fascia 80 of the vehicle 10 when the movable rear body panel 18 is in the extended (open) position. Once in the movable rear body panel 18 is in the extended (open) position, the movable rear body panel 18 can be pivoted between the upright orientation and the horizontal orientation. Preferably, the movable rear body panel 18 is provided with an interior panel 76 that is pivotally mounted to cover the gap between the bottom edge of the movable rear body panel 18 and the rear end of the bumper fascia 80.

In the main embodiment, as seen in FIGS. 27 to 30, the movable rear body panel 18 is connected to the vehicle body 12 by a connection arrangement that basically includes a pair of fixed rails 82 and a pair of sliding rails 84. The fixed rails 82 and the sliding rails 84 constitutes a linear extension mechanism that is operatively coupled between the rear body panel and the vehicle body to slide the movable rear body panel 18 with respect to the vehicle body 12 between the retracted position and the extended position. The fixed rails 82 are disposed on opposite lateral sides of the cargo (trunk) area 24, with the sliding rails 84 being telescopically mounted on the fixed rails 82. The fixed rails 82 are fixedly attached to the rear floor/side wall of the vehicle body 12. The rear ends of the sliding rails 84 are pivotally mounted to the movable rear body panel 18 by two rear hinge pins 86 that form a hinge operatively coupling the movable rear body panel 18 to the vehicle body 12 to pivot the movable rear body panel 18 with respect to the vehicle body 12 between the upright orientation and the horizontal orientation. The sliding rails 84 enable the movable rear body panel 18 to move rearward, far enough away from the rear vehicle structures such that this movable rear body panel 18 can be hinged down similar to a pickup truck without interfering with the rear bumper.

The connection arrangement includes a pair of electronic latches 88 and 90 that form a locking arrangement for the sliding rails 84. The driver's side sliding rail 84 is provided with a striker or latch pin 84a that selectively engages the latches 88 and 90 depending upon the position of the movable rear body panel 18. The forward latch 88 locks the movable rear body panel 18 in the retracted (closed) position, while the rearward latch 90 locks the movable rear body panel 18 in the extended (open) position, respectively. Preferably, the latches 88 and 90 are all operated by an electronic slide release button 92 (see, FIGS. 1, 5, 6 and 13). In the illustrated embodiment, the slide release button 92 is provided on the movable rear body panel 18 under the eyebrow of the license plate for electronically operating the latches 88 and 90. Once the operator pushes the slide release button 92, solenoids of the latches 88 and 90 are simultaneously energized to open the latches 88 and 90 and release the latch pin 84a from whichever of the latches 88 and 90 that was engaged with the latch pin 84a.

The movable rear body panel 18 has a pair of latch pins 95 that engage a pair of electronic tailgate latches 96 to lock the movable rear body panel 18 to the rear end of the vehicle body 12. Preferably, the tailgate latches 96 are both operated by the slide release button 92. Thus, pushing the slide release button 92 simultaneously unlocks the movable rear body panel 18 and the sliding rails 84 from the rear end of the vehicle body 12.

Preferably, as seen in FIGS. 27 to 30, the movable rear body panel 18 includes a latching mechanism 97 that is operatively coupled to the sliding rails 84 (part of the connection arrangement) to selectively latch the movable rear body panel 18 in the upright orientation and to selectively release the movable rear body panel 18 to the horizontal orientation. The mechanism 96 basically includes a release handle 97a, a linkage 97b and a pair of locking pins 97c. The linkage 97b operatively couples the release handle 97a to the locking pins 97c to move the locking pins 97c between a locked position and an unlocked position. Normally, the linkage 97b urges the locking pins 97c to the locked position. Thus, the release handle 97a is pulled (pivoted) to cause the linkage 97b to retract the locking pins 97c from the locked (extended) position to the unlocked (retracted) position. When the movable rear body panel 18 is in the upright orientation, the locking pins 97c will normally be engaged in a first set of holes in the rear ends of the sliding rails 84 to hold the movable rear body panel 18 in the upright orientation. When the movable rear body panel 18 is in the horizontal orientation, the locking pins 97c will normally be engaged in a second set of holes in the rear ends of the sliding rails 84 to hold the movable rear body panel 18 in the horizontal orientation.

Preferably, as seen in FIGS. 26 to 30, an interlock 98 is provided between the linkage 97b and the sliding rails 84 so that the movable rear body panel 18 cannot be moved from the upright orientation to the horizontal orientation until the movable rear body panel 18 is moved such that the bottom ledge of the movable rear body panel 18 is moved rearwardly of the bumper fascia 80 of the vehicle 10. Thus, the movable rear body panel 18 can then be safely moved from the upright orientation to the horizontal orientation without the bottom ledge of the movable rear body panel 18 contacting the rear exterior body surface of the bumper fascia 80. In particular, the interlock 98 has a latch 98a, a cable 98b and an actuator 98c. The latch 98a is operatively connected to the actuator 98c by the cable 98b. One of the sliding rails 84 is provided with an actuating pin 84b that selectively engages the actuator 98c to pull the cable 98b such that the latch 98a unlocks the latching mechanism 97, when the movable rear body panel 18 is moved to the full extended position. In particular, the actuator 98c is pivotally mounted to the vehicle body with the actuator 98c being arranged in the path of the actuating pin 84b such that the actuating pin 84b pivots the actuator 98c against a urging force of a spring when the movable rear body panel 18 is moved to the full extended position. This movement of the actuator 98c pulls the cable 98b, which in turn pulls the latch 98a out of a notch in the linkage 97b of the latching mechanism 97. Once the latch 98a is pulled out of the notch in the linkage 97b of the latching mechanism 97, the release handle 97a can be pulled (pivoted) to cause the linkage 97b to retract the locking pins 97c from the first set of holes in the rear ends of the sliding rails 84.

Thus, the movable rear body panel 18 is rearwardly movable by the sliding rails 84 (part of the connection arrangement) with respect to the vehicle body 12 to the extended position with the latching mechanism 97 maintaining the movable rear body panel 18 in the upright orientation. Then the movable rear body panel 18 can be subsequently moved from the upright orientation to the horizontal orientation after providing clearance between the bottom ledge of the movable rear body panel 18 and the rear exterior body surface of the bumper fascia 80.

By using the latching mechanism 97, the movable rear body panel 18 is provided with two locking positions to secure it in both the "normal" mode and "high utility" mode. Thus, once the movable rear body panel 18 is slid rearward it can be used two ways. In the first "normal" mode, if one wishes to carry shorter articles, then one can just slide the movable rear body panel 18 rearward but keep the movable rear body panel 18 in the upright orientation. In this mode the movable rear body panel 18 will serve as a tailgate securing the cargo into the expanded trunk space. In this mode the rear trunk lid 16 could still be closed however some portion of the box would be exposed due to the increased trunk length. In the second "high utility" mode, if one wishes to carry a longer articles, then one can just slide the movable rear body panel 18 rearward and fold the movable rear body panel 18 down. In this second mode it would be very similar to loading a long object in a pickup truck and keeping the tailgate down. This second mode would be useful for hauling a tall ladder or long lumber.

The operation of the movable rear body panel 18 will now be summarized. First, the operator presses the slide release button 92 to unlock the movable rear body panel 18 and the sliding rails 84 from the rear end of the vehicle body 12. Then the movable rear body panel 18 is pulled (slid) rearward until the rearward latches 92 engage the pins 84a to lock the sliding rails 84. Now, the movable rear body panel 18 can be folded down if needed and/or desired by operating the release handle 97a to cause the linkage 97b to retract the locking pins 97c from the first set of holes in the rear ends of the sliding rails 84. To reset the movable rear body panel 18 to the normal driving mode, the release handle 97a is operated to retract the locking pins 97c from the second set of holes in the rear ends of the sliding rails 84. Then the movable rear body panel 18 can be raised to the upright orientation and locked by the locking pins 97c from engaging the first set of holes in the rear ends of the sliding rails 84. Now, the slide release button 92 is pressed to unlock the sliding rails 84 so that they can slide forward. By sliding the movable rear body panel 18 forward, the latch pins 95 of the movable rear body panel 18 engage the tailgate latches 96 to lock the movable rear body panel 18 to the vehicle body 12 and the pins 84a of the sliding rails 84 engage the latches 90 to lock the sliding rails 84 to the vehicle body 12.

Figure 30:
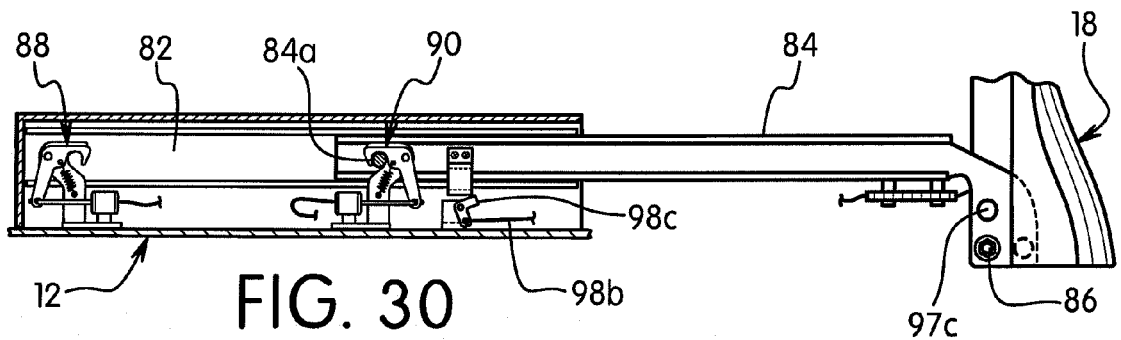
FIG. 30 is a simplified side elevational view, similar to FIGS. 27 to 29, of one of the rear panel sliding mechanism in a rear locked position for holding the pivotal rear panel in the extended position.
Figure 31:
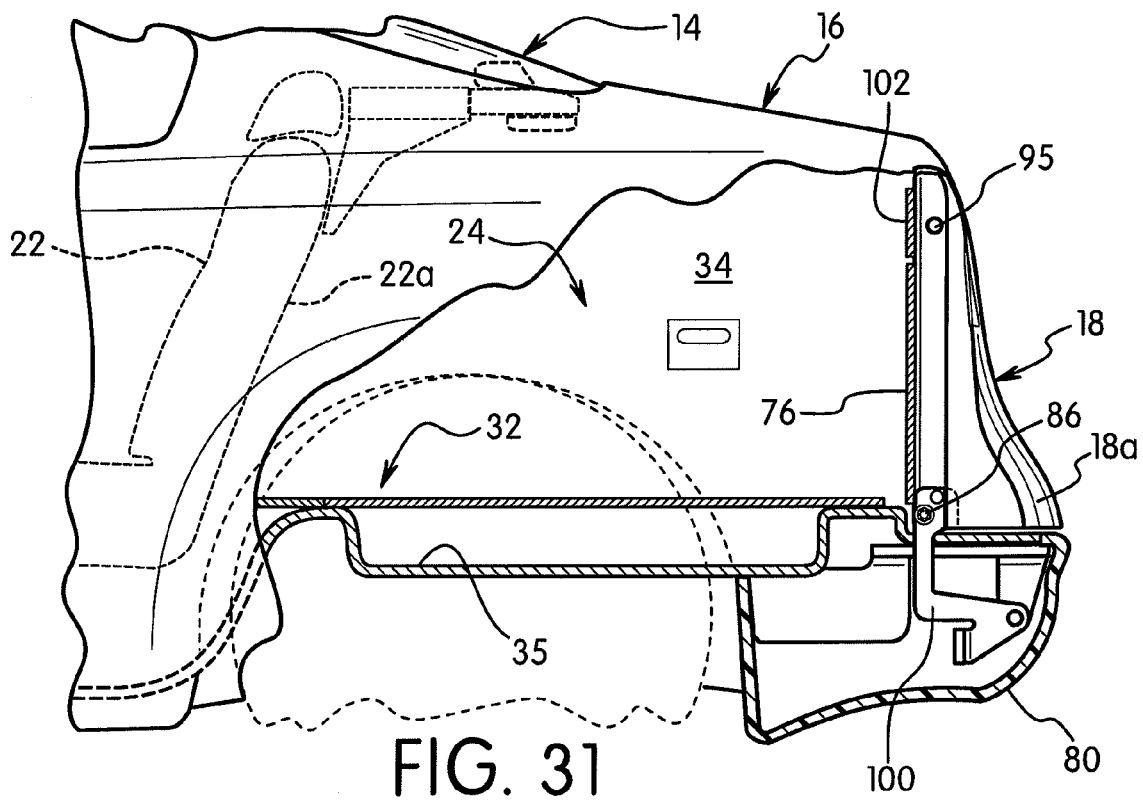
FIG. 31 is a simplified longitudinal cross sectional view of a rear portion of a passenger vehicle in accordance with an alternate embodiment with the pivotal rear panel in the closed position.
Figure 32:
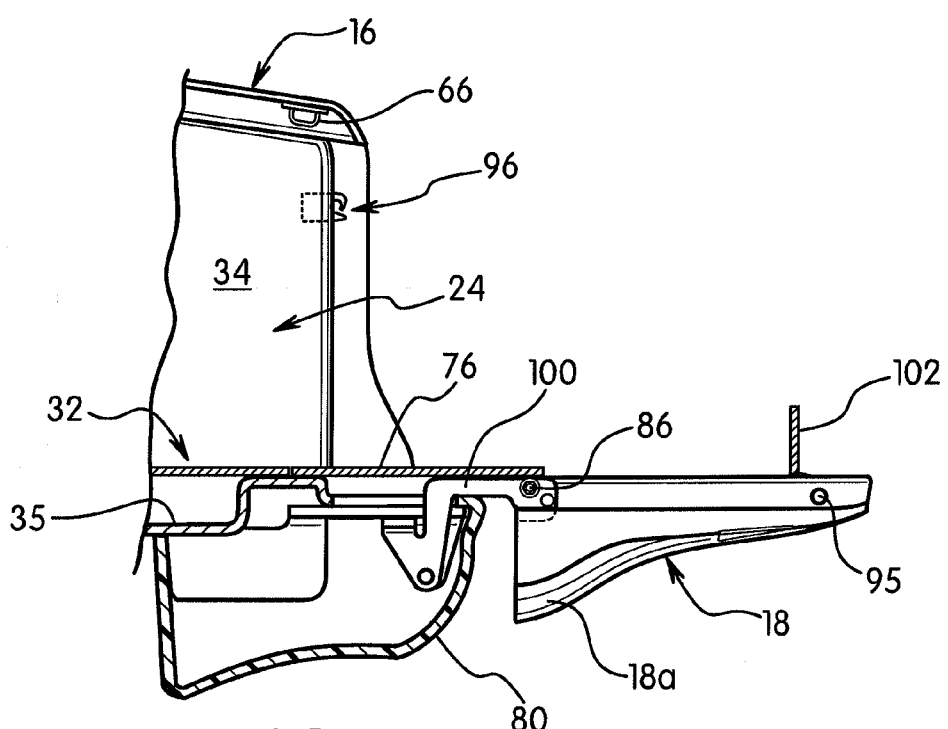
FIG. 32 is a simplified longitudinal cross sectional view, similar to FIG. 31, of the rear portion of the passenger vehicle in accordance with the alternate embodiment showing the pivotal rear panel in the open position (horizontal orientation)

Alternatively, the movable rear body panel 18 can be attached to the vehicle body 12 by using a pair of goose head hinges 100 disposed on each side of the movable rear body panel 18. The goose head hinges 100 moves the movable rear body panel 18 in a manner so that the bottom ledge of movable rear body panel 18 clears the bumper fascia 80. Optionally, as seen in FIGS. 30 and 31, the movable rear body panel 18 includes an interior panel with a cargo stop 102 extending in a lateral direction across the interior panel. The cargo stop 100 is movable (pivotal) between a non-use position (FIG. 31) and a projecting position (FIG. 32). Also, while the cargo stop 100 is illustrated as being used with the movable rear body panel 18 being attached to the vehicle body 12 by the goose head hinges 100, the cargo stop 100 can also be used when the movable rear body panel 18 is attached to the vehicle body 12 by the linear extension mechanism (e.g., the sliding rails 84.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A passenger vehicle trunk structure comprising:
   a trunk lid;
   a vehicle body defining an interior cargo area with an exterior trunk access opening; and
   a hinge arrangement pivotally coupling the trunk lid to the vehicle body with the trunk lid being movable between a closed position that covers the exterior trunk access opening and an open position that exposes the exterior trunk access opening to provide access to the interior cargo area through the exterior trunk access opening; and
   a tool free hinge release mechanism operatively coupled to the hinge arrangement such that the tool free hinge release mechanism engages the hinge arrangement to completely release the trunk lid from the entire vehicle body.

2. The passenger vehicle trunk structure according to claim 1, wherein
   the vehicle body includes a floor panel, a pair of side panels, a rear panel and a front panel that define the interior cargo area below the exterior trunk access opening.

3. The passenger vehicle trunk structure according to claim 2, wherein
   the front panel is foldable in a forward vehicle direction to provide an interior trunk access opening for accessing the interior cargo area below the exterior trunk opening from a passenger cabin.

4. The passenger vehicle trunk structure according to claim 1, wherein
   the vehicle body is a unitized vehicle body with the hinge arrangement pivotally coupled to a rear part of the unitized vehicle body.

5. The passenger vehicle trunk structure according to claim 1, wherein
   the hinge arrangement includes a first hinge located on a first lateral side of the trunk lid and a second hinge located on a second lateral side of the trunk lid, and
   the tool free hinge release mechanism includes a single user operating member operatively coupled to the first and second hinges to simultaneously release the first and second hinges in response to operation of the single user operating member.

6. The passenger vehicle trunk structure according to claim 5, wherein
   the single user operating member of the tool free hinge release mechanism is mounted on the trunk lid.

7. The passenger vehicle trunk structure according to claim 1, wherein
   the tool free hinge release mechanism includes a manually operated handle that is movable to release the first and second hinges.

8. The passenger vehicle trunk structure according to claim 1, wherein
   the hinge arrangement includes a first hinge mounted on a first lateral side of the trunk lid and a second hinge located on a second lateral side of the trunk lid, and
   the tool free hinge release mechanism includes a first latch mounted on a first lateral side of the vehicle body for selectively securing the first hinge to the vehicle body and a second latch mounted on a second lateral side of the vehicle body for selectively securing the second hinge to the vehicle body such that the first and second hinges remain on the trunk lid when the first and second latches are released and the trunk lid is removed.

9. The passenger vehicle trunk structure according to claim 8, wherein
the tool free hinge release mechanism includes a single user operating member operatively coupled to the first and second latches to simultaneously release the first and second hinges in response to operation of the single user operating member.

10. The passenger vehicle trunk structure according to claim 9, wherein
the single user operating member of the tool free hinge release mechanism is mounted on the trunk lid.

11. The passenger vehicle trunk structure according to claim 8, wherein
the tool free hinge release mechanism includes a manually operated handle that is movable to operate the first and second latches to release the first and second hinges.

12. A passenger vehicle trunk structure comprising:
a trunk lid;
a vehicle body defining an interior cargo area with an exterior trunk access opening, the vehicle body including a trunk lid receiving compartment and a floor panel overlying the trunk lid receiving compartment to define a floor of the interior cargo area, with the trunk lid receiving compartment being dimensioned to receive the trunk lid beneath the floor panel; and
a hinge arrangement pivotally coupling the trunk lid to the vehicle body with the trunk lid being movable between a closed position that covers the exterior trunk access opening and an open position that exposes the exterior trunk access opening to provide access to the interior cargo area through the exterior trunk access opening; and
a tool free hinge release mechanism operatively coupled to the hinge arrangement to release the trunk lid from the vehicle body.

13. A passenger vehicle trunk structure comprising:
a trunk lid;
a vehicle body defining an interior cargo area with an exterior trunk access opening; and
a hinge arrangement including a first hinge mounted on a first lateral side of the vehicle body and a second hinge located on a second lateral side of the vehicle body, the hinge arrangement pivotally coupling the trunk lid to the vehicle body with the trunk lid being movable between a closed position that covers the exterior trunk access opening and an open position that exposes the exterior trunk access opening to provide access to the interior cargo area through the exterior trunk access opening; and
a tool free hinge release mechanism operatively coupled to the hinge arrangement to release the trunk lid from the vehicle body, the tool free hinge release mechanism including a first latch mounted on a first lateral side of the trunk lid for selectively securing the first hinge to the trunk lid and a second latch mounted on a second lateral side of the trunk lid for selectively securing the second hinge to the trunk lid such that the first and second hinges remain on the vehicle body when the first and second latches are released and the trunk lid is removed.

14. The passenger vehicle trunk structure according to claim 13, wherein
the tool free hinge release mechanism includes a single user operating member operatively coupled to the first and second latches to simultaneously release the first and second hinges in response to operation of the single user operating member.

15. The passenger vehicle trunk structure according to claim 14, wherein
the single user operating member of the tool free hinge release mechanism is mounted on the trunk lid.

16. The passenger vehicle trunk structure according to claim 13, wherein
the tool free hinge release mechanism includes a manually operated handle that is movable to operate the first and second latches to release the first and second hinges.

* * * * *